United States Patent [19]
Yasuno et al.

[11] Patent Number: 5,651,592
[45] Date of Patent: Jul. 29, 1997

[54] ANTISKID BRAKING DEVICE

[75] Inventors: Yoshiki Yasuno; Akira Higashimata, both of Kanagawa, Japan

[73] Assignee: Nissan Motor Co., Ltd., Yokohama, Japan

[21] Appl. No.: 554,782

[22] Filed: Nov. 7, 1995

[30] Foreign Application Priority Data

Nov. 8, 1994 [JP] Japan .................................. 6-273889

[51] Int. Cl.$^6$ .................................................. B60T 8/32
[52] U.S. Cl. ........................ 303/158; 303/156; 303/174
[58] Field of Search ................................ 303/121, 155, 303/158, 156, 165, 166, DIG. 4, DIG. 3, 167, 171, 175, 177, 174, 163, DIG. 5; 364/426.01, 426.02; 180/197; 188/181 A, 181 R

[56] References Cited

U.S. PATENT DOCUMENTS

| | | | |
|---|---|---|---|
| 4,637,663 | 1/1987 | Matsuda | 303/158 |
| 4,660,896 | 4/1987 | Matsuda | 303/156 |
| 4,805,104 | 2/1989 | Kishimoto et al. | 303/174 |
| 5,236,255 | 8/1993 | Kuwana et al. | 303/158 |

FOREIGN PATENT DOCUMENTS 2-3564  1/1990  Japan .

*Primary Examiner*—Douglas C. Butler
*Attorney, Agent, or Firm*—Lowe, Price, LeBlanc & Becker

[57] ABSTRACT

In an antiskid brake system that increases or decreases a wheel cylinder pressure according to a wheel speed and vehicle speed, an algorithm applied to pressure increase after pressure decrease is improved. A first target pressure increase amount is computed based on the wheel speed and vehicle speed, and a second target pressure increase amount is computed based on a total pressure decrease amount when pressure is decreased. The wheel cylinder pressure is then increased according to the first target pressure increase amount when an elapsed time from the start of pressure decrease to the start of pressure increase, is longer than a predetermined value, and according to the second target pressure increase amount when the elapsed time is shorter than the predetermined value. In this way, increase of slip amount due to excessive pressure increase is prevented.

4 Claims, 11 Drawing Sheets

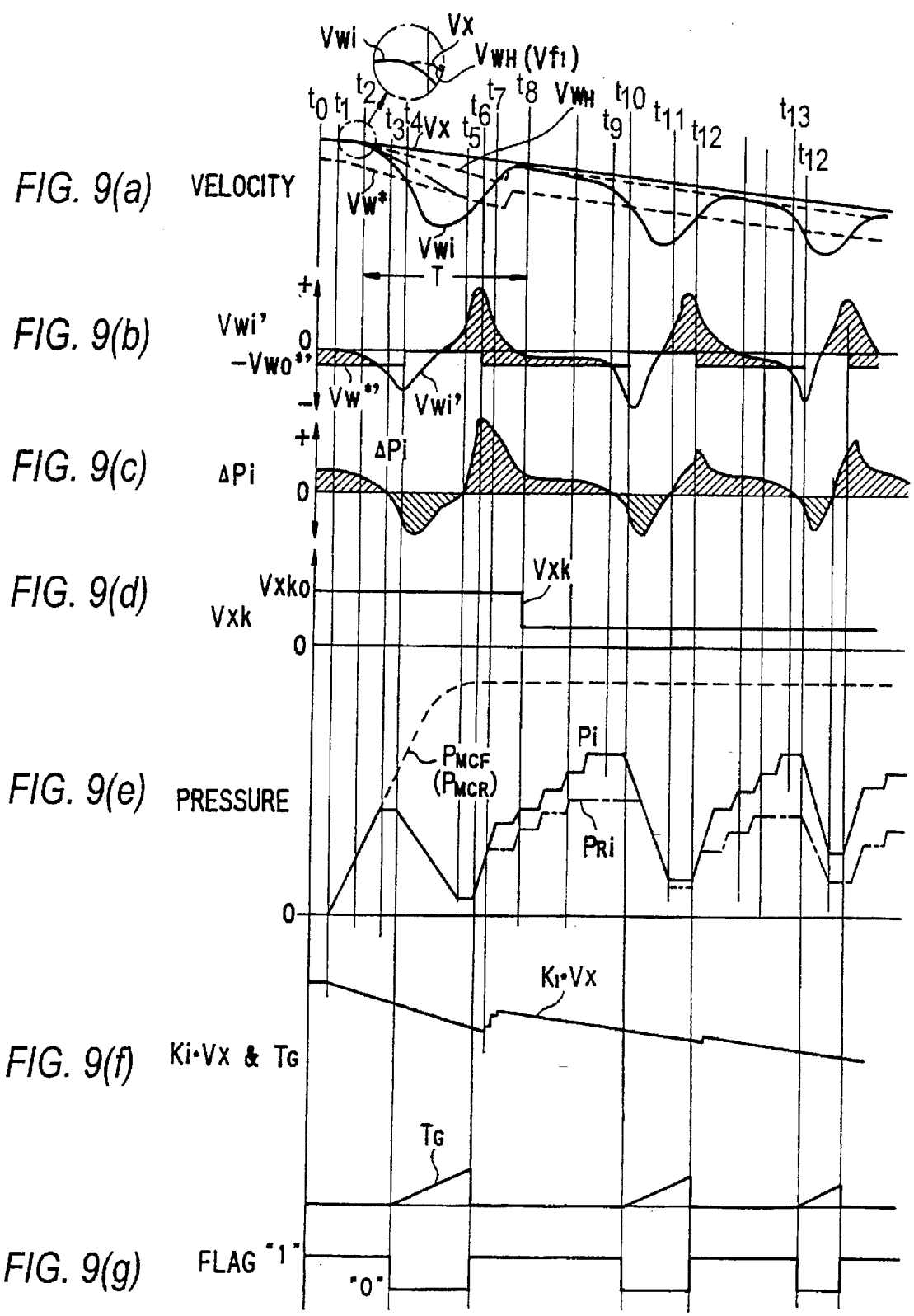

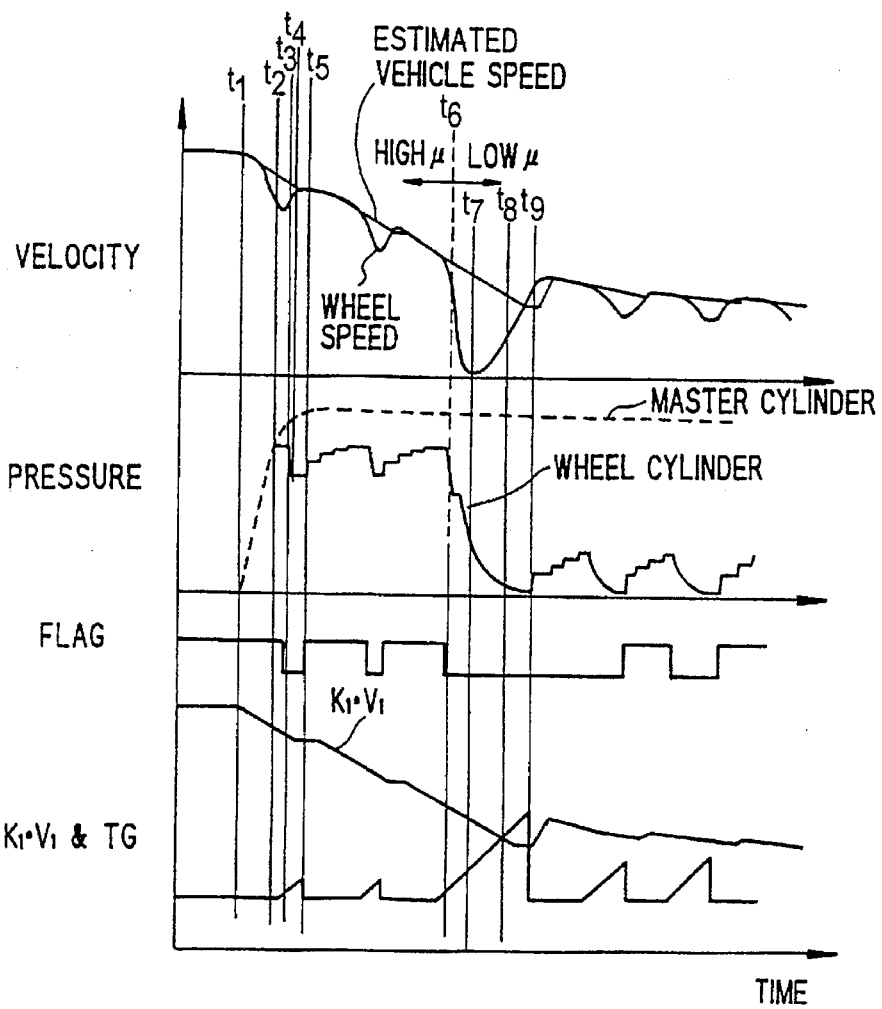

ANTISKID BRAKING DEVICE

FIELD OF THE INVENTION

This invention relates to an antiskid brake that prevents the wheels of a vehicle from locking due to braking.

BACKGROUND OF THE INVENTION

An antiskid brake that prevents the wheels of a vehicle from locking due to braking generally detects a slip factor of the wheels, and controls the braking pressure so that the slip factor is within a predetermined range. This predetermined range is generally set to be centered on the slip factor at which the braking force is maximum.

When the slip factor exceeds this predetermined range the braking force is decreased, and when it returns to the predetermined range, the brake pressure is increased.

In order to stabilize the slip factor as rapidly as possible, Tokkai Hei 2-3564 published by the Japanese Patent Office in 1990 proposes an algorithm wherein proportional integral control is applied to the pressure increase process. According to this algorithm, a total pressure decrease amount during the immediately preceding pressure decrease operation is stored, and when it is increased, an amount obtained by multiplying the total decrease amount by a fixed proportion is increased in one operation as a proportional pressure increase. Subsequently, the pressure is increased in small steps by integrating pressure increase amounts of smaller value until the predetermined range is exceeded. In this way, the time required for the slip factor to stabilize on the same road surface is reduced.

However, this control is effective only when road conditions are constant. For example, when the vehicle moves from a road with a high frictional coefficient such as a dry, surfaced road onto a road with a low frictional coefficient such as a wet road or icy road, the slip factor increases sharply, so the braking pressure is largely reduced until the slip factor returns to within the predetermined range.

When the slip factor returns to the predetermined range, the braking pressure is increased, and according to the aforesaid algorithm, the proportional pressure increase is determined based on the immediately preceding total pressure reduction. However, the immediately preceding pressure decrease is large due to the change of frictional coefficient, and consequently the proportional pressure increase amount based on this value may be excessive for the low frictional coefficient so that the slip factor immediately leaves the predetermined range. In this case, the slip factor oscillates with a large amplitude, and there is an adverse effect on the stability of the slip factor.

SUMMARY OF THE INVENTION

It is therefore an object of this invention to perform stable braking pressure control independently of variations of road surface conditions.

It is a further object of this invention to increase the precision of detecting road condition variations.

It is yet a further object of this invention to increase the response of antiskid control.

In order to achieve the above objects, this invention provides an antiskid braking device for braking a wheel of a vehicle. The device comprising a brake pedal, a master cylinder that generates a pressure according to a depression amount of the brake pedal, a wheel cylinder that applies a braking force to the wheel according to the pressure of the master cylinder, a mechanism for detecting a rotation speed of the wheel, a mechanism for detecting a vehicle speed, a mechanism for detecting the braking force, a mechanism for decreasing the braking force based on the wheel speed and the vehicle speed, a mechanism for increasing the braking force according to a target increase amount, a mechanism for computing a first target increase amount based on the wheel speed and the vehicle speed when the increasing mechanism increases the braking force after the decreasing mechanism has decreased the braking force, a mechanism for computing a second target increase amount based on a braking force amount which the decreasing mechanism has decreased, a mechanism for measuring an elapsed time from when the decreasing mechanism started decreasing the braking force until when the increasing mechanism starts increasing the braking force, a mechanism for applying the first target increase amount to the increasing mechanism when the elapsed time is longer than a predetermined value, and applying the second target increase amount to the increasing mechanism when the elapsed time is shorter than the predetermined value.

It is preferable that the device further comprises a mechanism for computing a wheel deceleration, a target wheel speed and a target wheel deceleration based on the wheel speed and vehicle speed, and the first target increase amount computing mechanism comprises a mechanism for computing a proportional term comprising a difference between the wheel speed and the target wheel speed, a mechanism for computing a differential term comprising a difference between the wheel acceleration and the target wheel acceleration, and a mechanism for adding the differential term to the proportional term.

It is also preferable that the device further comprises a mechanism for varying the predetermined value as a function of the vehicle speed.

The details as well as other features and advantages of this invention are set forth in the remainder of the specification and are shown in the accompanying drawings.

BRIEF DESCRIPTION OF THE DRAWINGS

FIGS. 9(a)–9(g) are a timing chart showing antiskid control according to this invention on a running surface having a fixed road surface frictional coefficient.

FIGS. 10(a)–10(d) are a timing chart showing antiskid control according to this invention on a running surface where the road surface frictional coefficient varies sharply.

DESCRIPTION OF THE PREFERRED EMBODIMENTS

Figure 1:
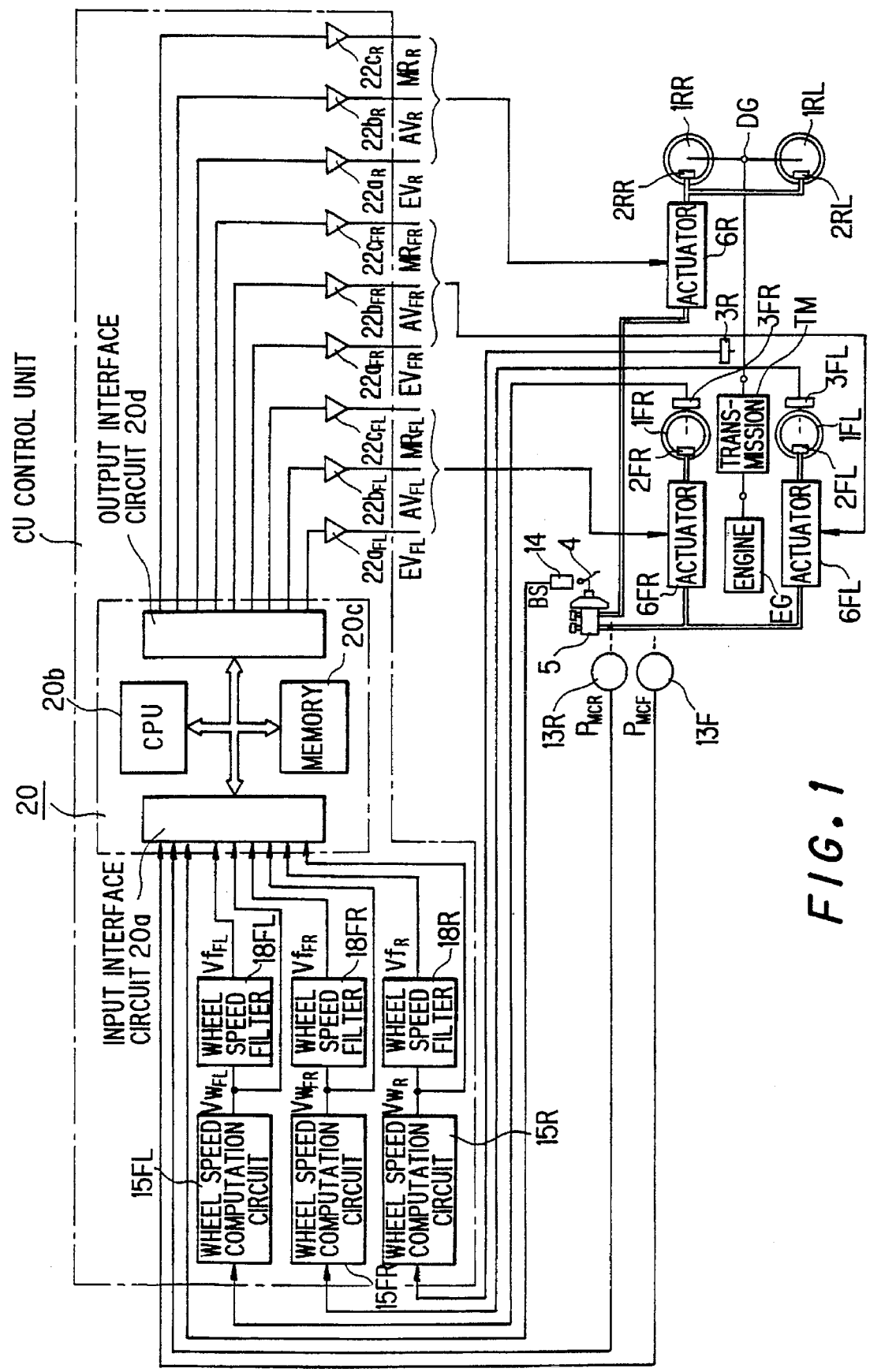
FIG. 1 is a schematic diagram of an antiskid brake system according to this invention.

Referring to FIG. 1 of the drawings, in a vehicle fitted with front wheels 1FL, 1FR and rear wheels 1RL, 1RR which are drive wheels, the rotation of an engine EG is transmitted to the rear wheels 1RL, 1RR via a transmission TM, propeller shaft PS and differential gear DG.

A braking force is applied to each wheel by oil pressure wheel cylinders 2FL, 2FR, 2RL and 2RR. The front wheels 1FL, 1FR are provided with wheel speed sensors 3FL, 3FR that output a pulse signal according to the wheel rotation speed. The propeller shaft PS is also fitted with a rotation sensor 3R that outputs a pulse signal according to the rotation speed of the shaft PS. The rotation speed of the propeller shaft PS detected by the sensor 3R corresponds to the average value of the rotation speeds of the rear wheels 1RL, 1RR.

The brake pressure of these wheel cylinders is supplied form a master cylinder 5 according to a depression amount of a brake pedal 4.

The pressure of the master cylinder 5 is supplied separately to the front wheel cylinders 2FL, 2FR via actuators 6FL, 6FR. The pressure of the master cylinder 5 is also supplied to the rear wheel cylinders 2RL, 2RR via a signal actuator 6R.

The aforesaid construction is known as a 3-sensor/3-channel antiskid brake system.

Figure 2:
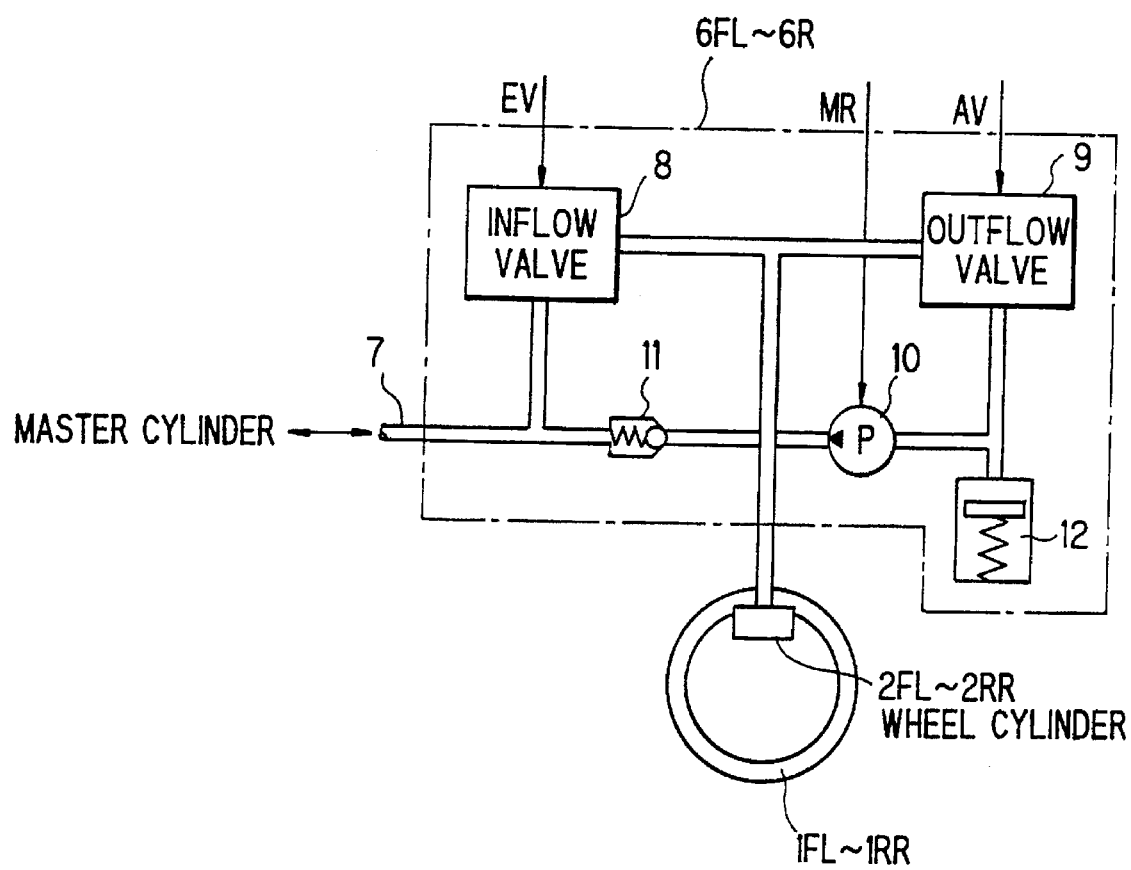
FIG. 2 is a schematic diagram of an actuator according to this invention.

As shown in FIG. 2, the actuators 6R, 6FL and 6FR each comprise an oil pressure pipe 7, electromagnetic inflow valve 8, electromagnetic outflow valve 8, oil pressure pump 10, check valve 11 and accumulator 12.

The oil pressure pipe 7 is connected to the master cylinder 5, and to the wheel cylinder 2FL (2FR, 2RL and 2RR) is connected to the oil pressure pump 10 and accumulator 12 via the electromagnetic outflow valve 9.

The oil pressure pump 10 operates according to a control signal MR output by a control unit CU. The oil it discharges passes through a check valve 11, and flows into the oil pressure pipe 7 upstream of the electromagnetic valve 8.

The inflow valve 8 and outflow valve 9 open and close according to control signals EV and AV respectively output by the control unit CU, and they control the inflow pressure and outflow of the wheel cylinder 2FL (2FR, 2RL and 2RR).

The control signals MR, EV and AV can each have only the two values 0 and 1. The oil pressure pump operates when MR=1, and stops when MR=0. The inflow valve 8 opens when EV=0 and closes when EV=1. The outflow valve 9 opens when AV=1 and closes when AV=0. The wheel cylinder 2FL (2FR, 2RL and 2RR) is therefore pressurized when EV and AV are both 0, and depressurized when EV and AV are both 1. When EV=1 and AV=0, the present pressure is maintained.

The rotation speeds of the front wheels 1FL, 1FR are detected by the wheel speed sensors 3FL, 3FR installed on each front wheel, and the rotation speeds of the rear wheels 1RL, 1RR are detected by the wheel speed sensor 3R installed on the propeller shaft PS. These detection signals are input to the control unit CU.

The vehicle further comprises a pressure sensor 13F that detects a pressure $P_{MCF}$ supplied to the front wheels and a pressure sensor 13R that detects a pressure $P_{MCR}$ supplied to the rear wheels from the master cylinder 5. Further provided is a brake switch 14 that outputs a brake switch signal BS corresponding to a depression amount of the brake pedal 4.

The control unit CU comprises an input interface 20a having an A/D conversion function, a microprocessor 20 having an output interface 20d, CPU 20b and memory 20c, wheel speed computing circuits 15FL, 15FR, 15R, wheel speed filters 18FL, 18FR, 18R that process the outputs of these computing circuits, and amplifying circuits 22FL, 22FR, 22R that convert the signals output by the microprocessor 20 into the control signals EV, AV and MR of the actuators 6FL, 6FR, 6R.

The wheel speed computing circuits 15FL, 15FR, 15R compute the wheel speeds $V_{W_{FL}}'$, $V_{W_{FR}}$, $V_{W_R}'$ from the input pulse signals and the rotation radii of the wheels.

The wheel speed filters 18FL, 18FR, 18R comprise a sample hold circuit 181 that holds a wheel speed $V_{W_l}$ as a sampling value $V_S$, and integrating circuit 182 comprising an operational amplifier that integrates an input voltage E and outputs an integral value $V_g$, an adder circuit 183 that adds the sampling value Vs and integral value $V_0$ so as to output a filter output $V_{fi}$, an insensitive zone circuit 184, a reset circuit and a selecting circuit 187.

The letter l in the symbols indicates FL, FR, RR.

The insensitive zone circuit 184 outputs determining signals $C_1$, $C_2$ that determine whether or not the wheel speed $V_{W_l}$ is within a predetermined insensitive zone relative to the filter output $V_{fi}$, i.e. whether or not $V_{fi}-1$ km/h<$V_{W_l}$<$V_{fi}+1$ km/h. The determining signals $C_1$, $C_2$ are low level when the wheel speed $V_{W_l}$ is within the insensitive zone. When $V_{fi}+1$ km/h$\leq V_{W_l}$ the determining signal $C_1$ is high level, and when $V_{W_l} \leq V_{fi}-1$ km/h, the determining signal $C_2$ is high level.

The reset circuit 185 holds the wheel speed $V_{W_l}$ in the sample hold circuit 181 and outputs a reset signal that resets the integrating circuit 182 when the wheel speed $V_{W_l}$ is within the insensitive zone and an ON signal is input by an ignition switch provided on the vehicle.

The selecting circuit 187 sets the input voltage E to 0 when the wheel speed $V_{W_l}$ is within the insensitive zone and until a predetermined time $T_3$ has elapsed from when the wheel speed $V_{W_l}$ moves outside the insensitive zone. In the non-antiskid control condition after the predetermined time $T_3$ has elapsed from when $V_{fi}+1$ km/h$\leq V_{W_l}$ a negative voltage corresponding to +0.4 G is set equal to the input voltage E. In the antiskid control condition after the predetermined time $T_3$ has elapsed from when $V_{fi}+1$ km/h$\leq V_{W_l}$ a negative voltage corresponding to +10 G is set equal to the input voltage E. Also, after the predetermined time $T_3$ has elapsed from when $V_{W_l} \leq V_{fi}-1$ km/h, a positive voltage corresponding to −1.2 G is set equal to the input voltage E.

The microprocessor 20 outputs a wheel speed slope $V_{XK}$ and an estimated vehicle speed $V_X$ based on the filter output $V_{fi}$, and computes a target wheel speed $V_W^*$ based on the estimated wheel speed $V_X$. It also differentiates the wheel speeds $V_{W_{FL}}$, $V_{W_{FR}}$, $V_{W_R}$ so as to respectively compute wheel accelerations $V_{W_{FL}}'$, $V_{W_{FR}}'$, $V_{W_R}'$. Based on the wheel speeds $V_{W_{FL}}$, $V_{W_{FR}}$, $V_{W_R}$, the wheel accelerations $V_{W_{FL}}'$, $V_{W_{FR}}'$, $V_{W_R}'$ and the target wheel speed $V_W^*$, target wheel cylinder pressures $P_{FL}^*$, $P_{FR}^*$, $P_R^*$ are computed. Estimated wheel cylinder pressures $P_{FL}$, $P_{FR}$, $P_R$ are also computed based on the master cylinder pressure detection values $P_{MCF}$, $P_{MCR}$, the wheel speed slope $V_X$ and the control signals EV, AV, MR output to the actuators 6R, 6FL, 6FR. Finally, signals $EV_{FL}$, $AV_{FL}$, $MR_{FL}$, $EV_{FR}$, $AV_{FR}$, $MR_{FR}$, $EV_R$, $AV_R$, $MR_R$ are respectively output to the actuators 6FL, 6FR, 6R such that these estimated wheel cylinder pressures $P_{FL}$, $P_{FR}$, $P_R$ and the target wheel cylinder pressures $P_{FL}^*$, $P_{FR}^*$, $P_R^*$ coincide.

The aforesaid process executed by the microprocessor will now be described with reference to the flowcharts of FIGS. 4–8.

First, the main antiskid control routine will be described with reference to FIG. 4, then the subroutines comprising each step will be described. This control is performed at a predetermined interval of, for example, 10 ms.

In a step S1, the supply pressures $P_{MCF}$, $P_{MCR}$ of the master cylinder 5 detected by the pressure sensors 13F, 13R, the wheel speeds $V_{W_{FL}}$, $V_{W_{FR}}$, $V_{W_R}$ output by the wheel speed computing circuits 15FL, 15FR, 15R, and the output values $V_{f_{FL}}$, $V_{f_{FR}}$, $V_{f_R}$ of the wheel speed filters 18FL, 18FR, 18R are read. The wheel speeds $V_{W_{FL}}$, $V_{W_{FR}}$, $V_{W_R}$ are then differentiated to compute the wheel accelerations $V_{W_{FL}}'$, $V_{W_{FR}}'$, $V_{W_R}'$. These values are stored in a predetermined storage region of the memory 20c. This storage operation is performed by updating the preceding stored values.

Figure 5:
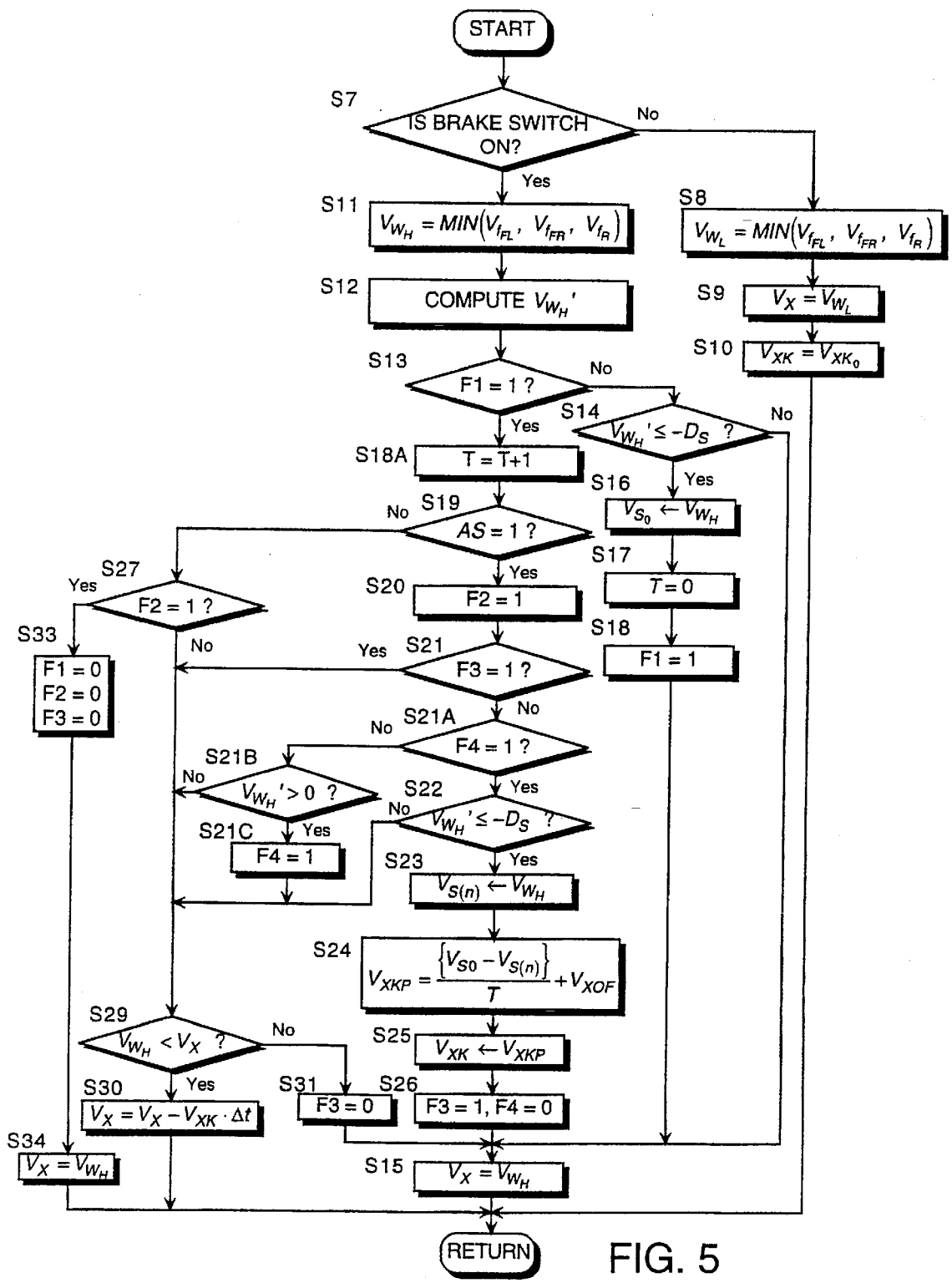
FIG. 5 is a flowchart describing a subroutine for estimating a vehicle speed $V_X$ according to this invention.

In a step S2, the wheel speed slope $V_{XK}$ and estimated vehicle speed $V_X$ are computed according to the process shown by the flowchart of FIG. 5 from the filter outputs $V_{f_{FL}}$, $V_{f_{FR}}$, $V_{f_R}$.

Figure 6:
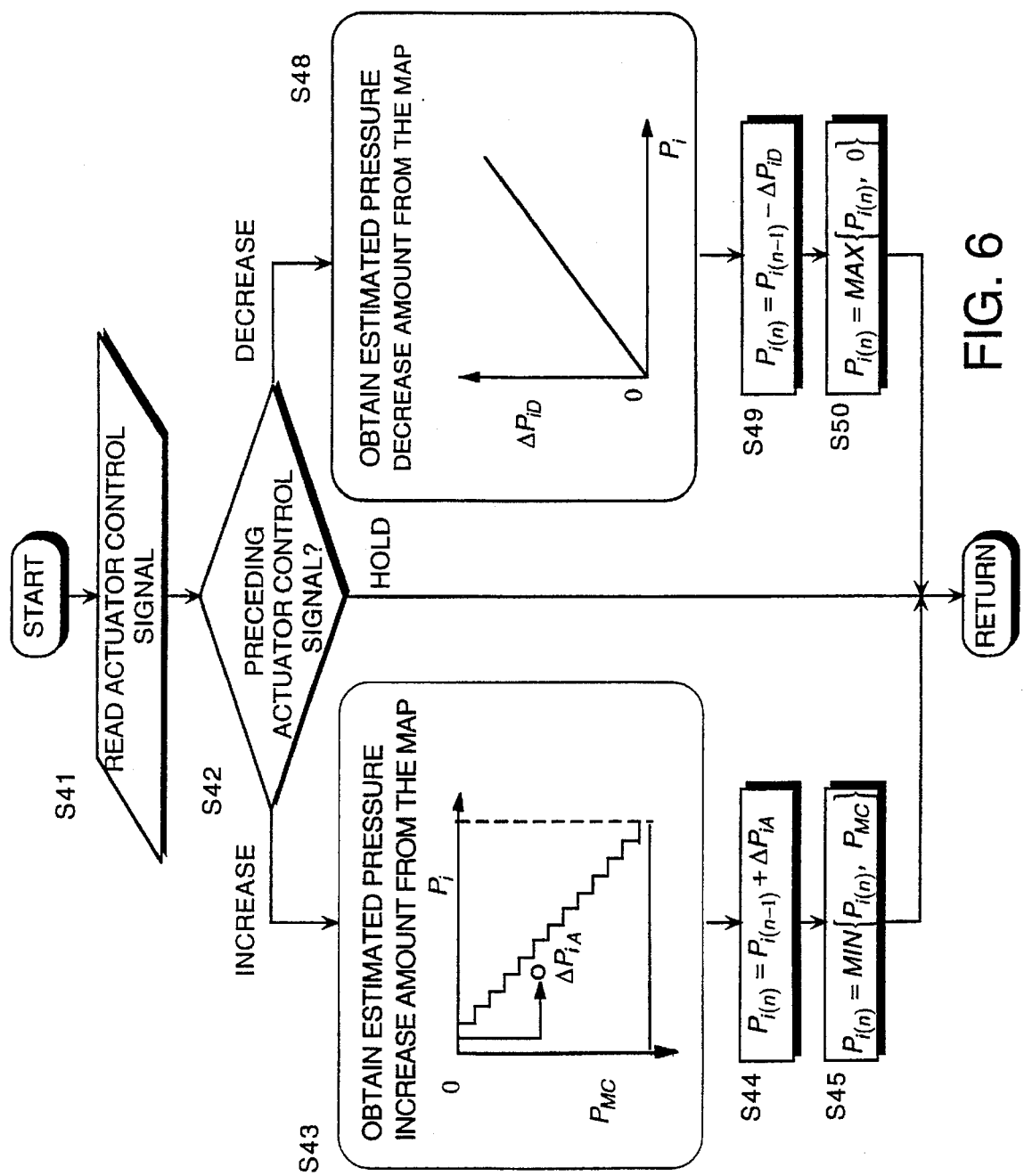
FIG. 6 is a flowchart describing a subroutine for estimating a wheel cylinder pressure according to this invention.

In a step S3, the present estimated wheel cylinder pressure $P_{FL}$, $P_{FR}$, $P_R$ are computed according to the process shown by the flowchart in FIG. 6 based on the master cylinder pressures $P_{MCF}$, $P_{MCR}$, and the immediately preceding control signals $EV_{FL}$, $AV_{FL}$, $MR_{FL}$, $EV_{FR}$, $AV_{FR}$, $MR_{FR}$, $EV_R$, $AV_R$, $MR_R$.

In a step S4, the computation of the equation (1) below is performed, the target wheel speed $V_W^*$ is computed, and this is stored in a target wheel speed storage region set in the memory 20c. This storage is performed by updating the preceding stored values.

$$V_{W_0}^* = 0.8 \cdot V_X \qquad (1)$$

where, $V_{W_0}^*$ is the target wheel speed and $V_X$ is the estimated vehicle speed.

In a step S4A, it is determined whether or not the target wheel speed $V_W^*$ is smaller than the wheel speed $V_{W_l}$. When $V_W^* < V_{W_l}$, a target wheel deceleration $V_W^{*'}$ is set to 0 in a step S4B, and this is stored in a target wheel deceleration storage region of the memory 20c. This storage also is performed by updating the preceding stored values. When $V_W^* \geq V_{W_l}$ in a step S4C, the target wheel deceleration $V_W^{*'}$ is computed by equation (2) below. The deceleration is expressed as a negative value, an increase of deceleration meaning that the absolute value of the deceleration increases.

$$V_W^{*'} = -V_{W_0}' \qquad (2)$$

where $V_W^{*'}$ is the target wheel speed and $V_{W_0}'$ is a set value.

Figure 7:
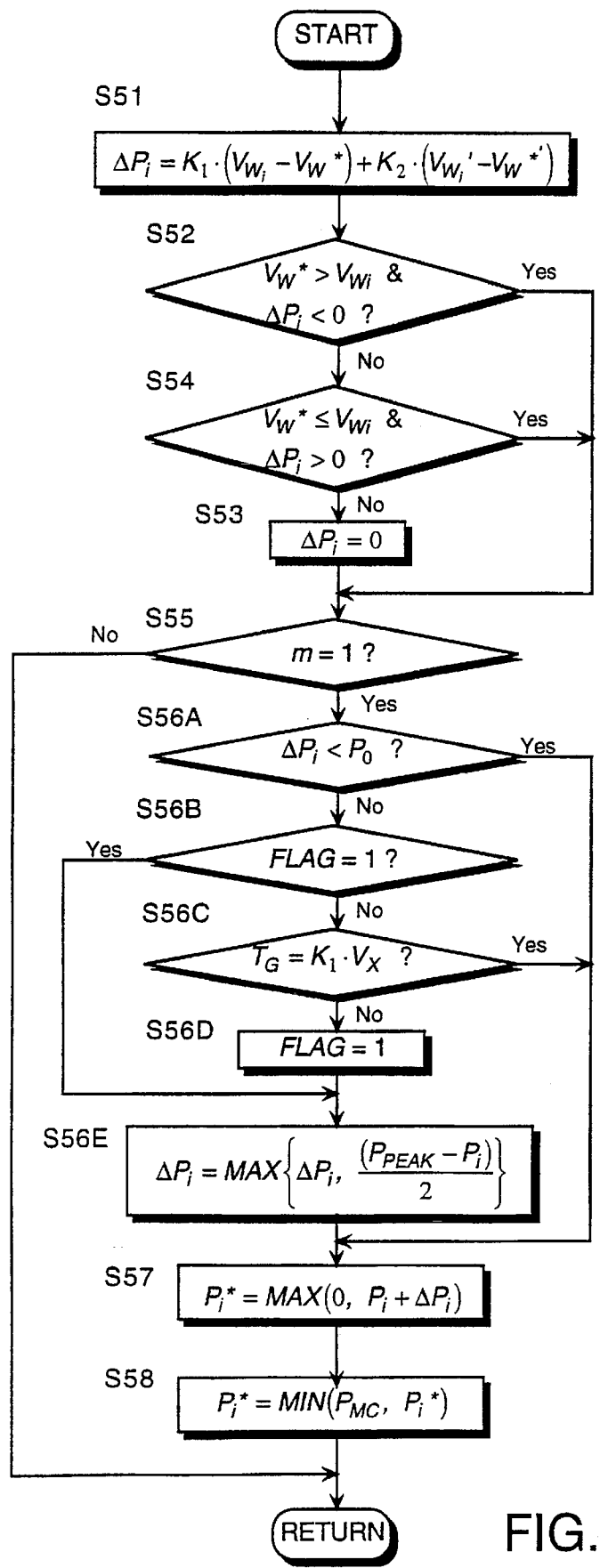
FIG. 7 is a flowchart describing a subroutine for computing a target wheel cylinder pressure according to this invention.

Next, in a step S5, the target wheel cylinder pressures $P_{FL}^*$, $P_{FR}^*$, $P_R^*$ are computed by the process shown by the flowchart of FIG. 7.

Figure 8:
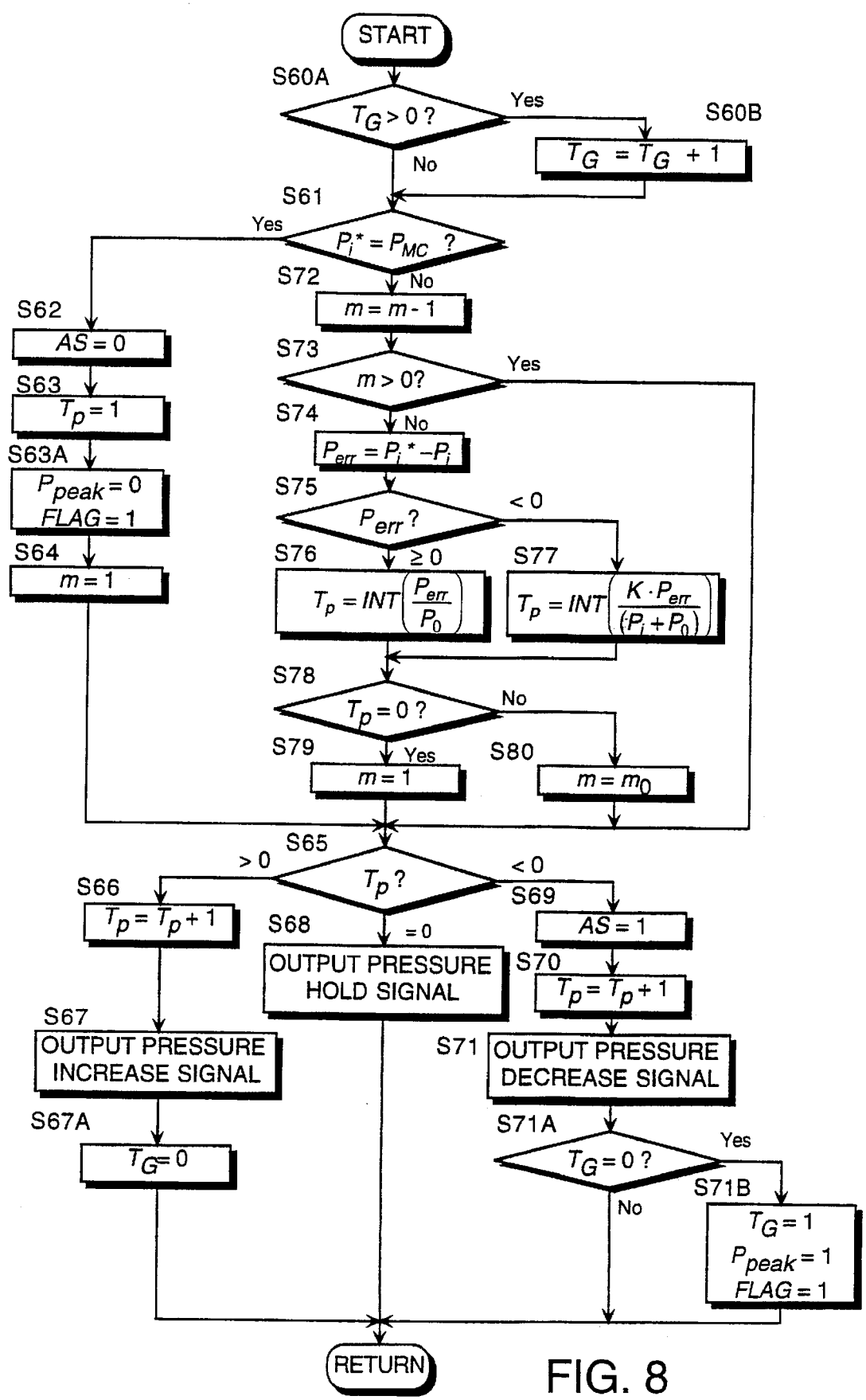
FIG. 8 is a flowchart describing an actuator control subroutine according to this invention.

Finally, in a step S6, control signals EV, AV, MR are determined, by the actuator control process shown by the flowchart of FIG. 8, according to the differences between the present estimated wheel cylinder pressures $P_{FL}$, $P_{FR}$, $P_R$ and target wheel cylinder pressures $P_{FL}^*$, $P_{FR}^*$, $P_R^*$. After outputting these signals, the routine is terminated.

The computation of the estimated vehicle speed $V_X$ performed in the step S2 uses the subroutine shown in the flowchart of FIG. 5. In this subroutine, it is first determined in a step S7 whether or not the brake switch signal BS is OFF.

When the brake switch signal BS is OFF, i.e. when the control operation is not taking place, the smallest value of the filter outputs $V_{f_{FL}}$, $V_{f_{FR}}$, $V_{f_R}$ is selected as a select-low wheel speed $V_{W_L}$ in a step S8 by equation (3) below.

$$V_X = MIN(V_{f_{FL}}, V_{f_{FR}}, V_{f_R}) \qquad (3)$$

where, $V_{f_{FL}}$ is filter output value of left front wheel, $V_{f_{FR}}$ is filter output value of right front wheel, $V_{f_R}$ is filter output value of rear wheel.

Next, in a step S9, the select-low wheel speed $V_{W_l}$ is stored as the estimated vehicle speed $V_X$ in a predetermined region of the memory 20c. In a step S10, the vehicle speed slope $V_{XK}$ is set to a preset predetermined value $V_{XK_0}$, and stored in an estimated vehicle speed storage region of the memory 20c. These storage operations are performed by updating the preceding stored values. After the aforesaid processing, the routine is terminated.

When on the other hand the brake switch signal BS is ON, i.e. when the control operation is taking place, the maximum value of the filter outputs $V_{f_{FL}}$, $V_{f_{FR}}$, $V_{f_R}$ is selected as a select-high wheel speed $V_{W_H}$ by equation (4) below in a step S11, and stored in the memory 20c. This storage operation takes place by updating the preceding stored values.

$$V_X = MAX(V_{f_{FL}}, V_{f_{FR}}, V_{f_R}) \qquad (4)$$

In a step S12, the select-high wheel speed $V_{W_H}$ is differentiated to compute a vehicle deceleration $V_{W_H}'$.

Next, in a step S13, a determination of a flag F1 showing whether or not this vehicle deceleration $V_{W_H}'$ exceeds a set deceleration $-D_S$. When F1=0, it is determined that the vehicle is not in a braking condition and the routine proceeds to a step S14.

In the step S14, the vehicle deceleration $V_{W_H}'$ is compared with the set deceleration $-D_S$. When $V_{W_H}' > -D_S$, it is determined that the vehicle is in a braking condition, the select-high wheel speed $V_{W_H}$ is stored as an estimated vehicle speed $V_X$ in a predetermined region of the memory 20c in a step S15, and the subroutine is terminated. This storage operation also is performed by updating stored values.

When $V_{W_H}' \leq -D_S$ in the step S14, the routine proceeds to a step S16. In the step S16, the select-high wheel speed $V_{W_H}$ is stored as a present sampling wheel speed $V_{S_0}$ in a present value storage region of the memory 20c. This storage operation also is performed by updating the preceding values.

Next, in a step S17, a timer that counts the elapsed time T is cleared, and after a flag F1 showing whether or not the wheel deceleration has exceeded a predetermined value, is set to 1 in a step S18 meaning that it has exceeded this value, the routine proceeds to the aforesaid step S15.

On the other hand, when the flag F1 showing that the wheel deceleration has exceeded the predetermined value is 1 in the aforesaid step S13, the timer value T is incremented by 1 in a step S18A, and it is determined in a step S19 whether or not an antiskid control flag AS is set to 1. This antiskid control flag AS is set in an antiskid control process described hereinafter, the value AS=1 showing that the wheel cylinder pressure is decreasing.

When AS=1, the flag F2 is set to 1 in a step S20. The flag F2 is a flag showing whether or not the antiskid control has begun. Next, in a step S21, it is determined whether or not a flag F3 is 1. The flag F3 is a flag showing whether or not the select-high wheel speed $V_{W_H}$ has decreased to less than the estimated vehicle speed $V_X$ stored on the immediately preceding occasion.

When F3=1, it is determined whether or not F4 is 1 in a step S21A. The flag F4 is a flag showing whether or not the select-high wheel speed $V_{W_H}$ is increasing or decreasing. F4=1 means that the select-high wheel speed $V_{W_H}$ is increasing. When F3=0, the routine proceeds to a step S29.

When F4=0, it is determined in a step S21B whether or not the wheel deceleration $V_{W_H}'$ is positive, and when the wheel deceleration $V_{W_H}' \leq 0$, the routine proceeds to the step S29 described hereinafter. When the wheel deceleration $V_{W_H}' > 0$, the control flag is set to 1 in a step S21C and the routine proceeds to the step S29.

When F4=1 in the step S21A, the wheel deceleration $V_{W_H}'$ is compared with the set deceleration $-D_S$ in a step S22 as in the step S14. When $V_{W_H}' > -D_S$, the routine proceeds to a step S29, and when $V_{W_H}' \leq -D_S$ the routine proceeds to a step S23. In the step S23, the present select-high wheel speed $V_{W_H}$ is stored as a present sampling wheel speed $V_{S(n)}$ in the present value storage region, and the routine proceeds to a step S24.

In the step S24, the vehicle speed slope $V_{XKP}$ is calculated from the equation below.

$$V_{XKP} = \frac{\{V_{S0} - V_{S(n)}\}}{T} + V_{XOF} \tag{5}$$

where,

T is the time elapsed from the immediately preceding sampling and $V_{XOF}$ is an offset value.

Next, the vehicle speed slope $V_{XKP}$ is stored as $V_{XK}$ in a step S25, the flag F3 is set to 1 and the flag F4 showing whether or not the vehicle deceleration is positive is set to 0 in a step S26, and the routine proceeds to the aforesaid step S15.

When the flag AS showing whether or not the vehicle is under antiskid control is 0 in the determination of the step S19, it is determined in a step S27 whether or not the flag F2 showing whether or not antiskid control has begun, is 1. When the flag F2=0, antiskid control has not yet begun and the routine proceeds to the step S29.

In the step S29, it is determined whether or not the select-high wheel speed $V_{W_H}$ is less than the estimated vehicle speed $V_X$. When $V_{W_H} < V_X$, in a step S30, a value obtained by multiplying the required sampling time $\Delta t$ by the vehicle speed slope $V_{XK}$ stored in the memory 20c, is subtracted from the estimated vehicle speed $V_X$, and the value obtained updates the value stored in the memory as the estimated vehicle speed $V_X$.

When $V_{W_H} \geq V_X$, the flag F3 showing the deceleration state of the vehicle is set to 0 in a step S31, and the routine proceeds to the step S15.

When F2=1 in the determination of the aforesaid step S27, the flags F1, F2, F3 and F4 are all reset to 0 in a step S33, the present select-high wheel speed $V_{W_H}$ is set as the estimated vehicle speed $V_X$ in a step S34, and the process of computing the estimated vehicle speed $V_X$ is terminated.

Using the estimated vehicle speed $V_X$ obtained by the process described hereinabove, a computation of the present estimated pressures $P_{FL}$, $P_{FR}$, $P_R$ of the wheel cylinders is performed in the step S3 of FIG. 4.

This subroutine will be described with reference to the flowchart of FIG. 6.

First, the control signals EV, AV, MR which were output on the immediately preceding occasion are read in a step S41, and it is determined in a step S42 from the read control signals whether the wheel cylinders 2FL, 2FR, 2RL, 2RR are in an increasing pressure, decreasing pressure or hold state.

When the pressure is increasing, in a step S43, an estimated wheel cylinder pressure $P_{i(n-1)}$ on the immediately preceding occasion is read from the memory 20c, and an estimated pressure increase amount $\Delta P_{iA}$ is found by referring to a map of estimated pressure increase amounts prestored in the memory 20c based on $P_{i(n-1)}$ and the master cylinder pressure $P_{MC}$ on the present occasion.

When the master cylinder pressure $P_{MC}$ is constant, the map of estimated pressure increase amount is set so that the estimated pressure increase amount $\Delta P_{iA}$ increases the larger the wheel cylinder pressure $P_{i(n-1)}$ on the immediately preceding occasion, and so that the estimated pressure increase amount $\Delta P_{iA}$ increases the larger the master cylinder pressure $P_{MC}$.

In a step S44, the estimated wheel cylinder pressure $P_{i(n)}$ on the present occasion is computed from the equation (6) below.

$$P_{i(n)} = P_{i(n-1)} + \Delta P_{iA} \tag{6}$$

Next, in a step S45, the computed estimated wheel cylinder pressure $P_{i(n)}$ is compared with the present master cylinder pressure $P_{MC}$ by equation (7) below, and the value stored in the memory 20c is updated by putting the lesser of the two values equal to the wheel cylinder pressure $P_{i(n)}$ on the present occasion.

$$P_{i(n)} = MIN\{P_{i(n)}, P_{MC}\} \tag{7}$$

Also, when the determination result of the step S42 is the hold state, this subroutine is terminated at this point.

When the determination result of a step 42C is the decreasing pressure state, the estimated wheel cylinder pressure $P_{i(n-1)}$ on the immediately preceding occasion which is stored in the memory 20c is read in a step S48, and an estimated pressure decrease amount $\Delta P_{iD}$ is found by referring to a map of estimated pressure decrease amount prestored in the memory 20c based on this value. The map of estimated pressure decrease amount is set so that the estimated pressure decrease amount $\Delta P_{iD}$ also increases the larger the estimated wheel cylinder pressure $P_{i(n-1)}$ on the immediately preceding occasion.

The estimated wheel cylinder pressure $P_{i(n)}$ on the present occasion is computed by equation (8) below in a step S49.

$$P_{i(n)} = P_{i(n-1)} - \Delta P_{id} \tag{8}$$

Next, using the following equation (9) in a step S50, the value stored in the memory 20c is updated by taking the value of the estimated wheel cylinder pressure $P_{i(n)}$ on the present occasion or 0, whichever is the larger.

$$P_i(n) = MAX\{P_i(n), 0\} \tag{9}$$

The computation of the target wheel cylinder pressure performed in the step S5, is performed by the subroutine shown by the flowchart of FIG. 7.

In this subroutine, a target pressure increase/decrease amount $\Delta P_i$ of proportional differential control (PD control) is computed by equation (10) below using the wheel speed $V_{W_i}$, and the target wheel speed $V_W^*$, wheel deceleration $V_{W_i}'$ and target wheel deceleration $V_W^{*'}$ calculated in the steps S4–S4C.

$$\Delta P_i = K_1 \cdot (V_{W_i} - V_W^*) + K_2 \cdot (V_{W_i}' - V_W^{*'}) \tag{10}$$

where, $K_1$ is the proportional gain and $K_2$ is the differential gain.

In this equation, the first term on the right-hand side is a proportional control term, and the second term on the right-hand side is a differential control term.

After this calculation, it is determined in a step S52 whether or not the target wheel speed $V_W{}^*$ is greater than the wheel speed $V_{Wi}$, and whether or not the target pressure increase/decrease amount $\Delta P_i$ is negative. When this condition does not hold, it is determined in a step S54 whether or not the target wheel speed $V_W{}^*$ is equal to or less than the wheel speed $V_{Wi}$, and whether or not the target pressure increase/decrease amount $\Delta P_i$ is positive. When also this condition does not hold, the target pressure increase/decrease amount $\Delta P_i$ is set equal to 0 in a step S53, and the routine proceeds to a step S55. Also, when any of these conditions has been satisfied, the routine proceeds directly to the step S55.

In the steps S52 and S53, it is determined whether or not the predetermined pressure decrease or pressure increase holds. If this is the case, the target pressure increase or decrease amount $\Delta P_i$ is used as it is to increase or decrease the wheel cylinder pressure, and if this is not the case, the target pressure increase or decrease amount $\Delta P_i$ is set equal to 0 in the step S53 so that the wheel cylinder pressure is maintained as it is.

In the step S55, it is determined whether or not a slow pressure increase/decrease period m for correcting the difference between a target wheel cylinder pressure $P_i{}^*$ and estimated wheel cylinder pressure $P_i$, is 1. This slow pressure increase/decrease period m is set in an actuator control process described hereinafter, but here it is determined whether or not m set on the immediately preceding occasion is 1. When m is not 1, the routine is terminated.

When m=1, the target pressure increase/decrease $\Delta P_i$ is compared with a reference value $P_0$ in a step S56A. When $\Delta P_i < P_0$, the routine jumps to a step S57, and when $\Delta P_i \geq P_0$, the routine proceeds to a step S56B where it is determined whether a flag FLAG, showing whether or not to permit the setting of a pressure increase/decrease amount according to a total pressure decrease amount, is set to 1. When FLAG is set to 1, the routine proceeds to a step S56E, and when FLAG=0, the routine proceeds to a step S56C.

In the step S56C, it is determined whether or not an elapsed time $T_G$ (counter value) from the immediately preceding occasion when pressure started to decrease, measured by an actuator control process described hereinafter, is larger than a value obtained by multiplying the estimated vehicle speed $V_X$ by a predetermined value $K_1$. When $T_G > K_1 \cdot V_X$, the routine jumps to the step S57. When $T_G \leq K_1 \cdot V_X$, the routine proceeds to a step S56D, the aforesaid pressure increase/decrease amount setting permission flag FLAG is set to 1, and the routine proceeds to the step S56E.

In the step S56E, the target pressure increase/decrease amount $\Delta P_i$ is set by equation (11) below, and the value of $\Delta P_i$ stored in the memory 20c is updated.

$$\Delta P_j = MAX \left\{ \Delta P_j, \frac{(P_{PEAK} - P_j)}{2} \right\} \quad (11)$$

where, $P_{PEAK}$ is the estimated value of braking pressure immediately before the preceding occasion when pressure begins to decrease, and $P_i$ is the estimated value of braking pressure on the present occasion.

In the step S57, the target wheel cylinder pressure $P_i{}^*$ is computed by equation (12) below.

$$P_i{}^* = MAX(0, P_i + \Delta P_i) \quad (12)$$

In a step S58, $P_i{}^*$ obtained in the step S57 is processed by the equation (13) below, the target wheel cylinder pressure $P_i{}^*$ is determined, and the subroutine is terminated.

$$P_i{}^* = MIN(P_{MC}, P_i{}^*) \quad (13)$$

The determination of the actuator control signals EV, AV, MR performed in the step S6 is performed by the subroutine shown in the flowchart of FIG. 8.

In this subroutine, firstly in a step S60A, it is determined whether or not the elapsed time (counter value $T_G$) from when pressure began to decrease, is positive, i.e. it is determined whether or not pressure decrease has begun. When pressure decrease has begun, the elapsed time $T_G$ stored in the memory 20c is updated by a new elapsed time $T_G$ obtained by adding 1 to it in a step S60B, and the routine proceeds to a step S61.

When the elapsed time $T_G$ is 0, the routine immediately proceeds to the step S61.

In the step S61, it is determined whether or not the target wheel cylinder pressure $P_i{}^*$ calculated in the step S5 is equal to the master cylinder pressure $P_{MC}$. When these two values are equal, the antiskid control start flag AS is reset to 0 in a step S62, and a pressure increase/decrease time $T_p$ is set to 1 in a step S63. This pressure increase/decrease time $T_p$ shows a control signal output hold time, meaning that during this time, the same control signal continues to be output. A positive $T_p$ indicates a pressure increase hold time, and a negative $T_p$ indicates a pressure decrease hold time.

Next, the routine proceeds to a step S63A, the estimated wheel cylinder pressure $P_{PEAK}$ immediately before pressure reduction begins is set to 0, and the pressure increase/decrease amount setting permission flag FLAG is set to 1. Then, in a step 64, the slow pressure increase/decrease period m which is a period for monitoring the difference between the target wheel cylinder pressure $P_i{}^*$ and the present wheel cylinder pressure $P_i$, is set to 1, and the routine proceeds to a step S65.

In the step S65, it is determined whether or not the pressure increase/decrease time $T_p$ is positive, 0 or negative. When $T_p > 0$, the pressure increase decrease time $T_p$ stored in the memory 20c is updated by a new value obtained by subtracting 1 from it in a step S66. The routine then proceeds to a step S67, and a pressure increase signal at which EV, AV, MR are all 0 is output. Also in a step S67A, the elapsed time $T_G$ is cleared and the subroutine is terminated.

In the determination of the step S65, when $T_p=0$, EV=1, AV=0, MR=0 hold signals are output in a step S68 and the subroutine is terminated.

In the determination of the step S65, when $T_p < 0$, the antiskid control flag AS is set to 1 in a step S69, and the pressure increase/decrease time $T_p$ is incremented by 1 in a step S70. A pressure decrease signal at which EV, AV, MR are all 1 is then output in a step S71.

Further, when the elapsed time $T_G=0$ in a step S71A, the following setting is performed. $T_G$ is set to 1 in a step S71B, the estimated wheel cylinder pressure $P_i$ is set equal to the estimated wheel cylinder pressure $P_{PEAK}$ immediately before pressure begins to decrease, and the pressure increase/decrease amount setting permission flag FLAG is reset to 0. After these steps are executed, the subroutine is terminated.

In the determination of the aforesaid step S61, when $P_{FL}^*$ is not equal to $P_{MC}$, the routine proceeds to a step S72. Here, a value obtained by subtracting 1 from the slow pressure increase/decrease period m is stored in the memory 20c as a new slow pressure increase/decrease period m. Then in a step S73, it is determined whether or not this slow pressure increase/decrease period m is positive. When m>0, the routine proceeds directly to the preceding step S65, and when m≤0, the routine proceeds to a step S74.

In the step S74, a difference between the target wheel cylinder pressure $P_i^*$ and the estimated wheel cylinder pressure $P_i$, $P_{err}=P_i^*-P_i$ is computed, and in a step S75, it is determined whether or not $P_{err}$ is larger than 0. When $P_{err} \geq 0$, the pressure increase/decrease time $T_p$ is computed by the equation (14) below in a step S76, and the routine proceeds to a step S78.

$$T_P = INT \left( \frac{P_{err}}{P_0} \right) \quad (14)$$

When $P_{err}<0$ in the step S75, the pressure, the pressure increase/decrease time $T_p$ is computed by equation (15) in a step S77, and the routine proceeds to a step S78.

$$T_P = INT \left\{ \frac{K \cdot P_{err}}{(P_i+P_0)} \right\} \quad (15)$$

where,

K is a constant.

In the step S78, it is determined whether or not the pressure increase/decrease time $T_p$ is 0, and when $T_p=0$, in a step S79, the slow pressure increase/decrease period m is set to 1, the value stored in the memory 20c is updated and the routine proceeds to the step S65. When $T_p$ is not equal to 0, in a step S80, the slow pressure increase/decrease period m is set to a predetermined value $m_0$, the value stored in the memory 20c is updated and the routine proceeds to the step S65.

Next, the aforesaid process will be described with reference to specific examples. First, the case will be described when the vehicle is travelling steadily in the non-braking condition on a road having a high frictional coefficient such as a surfaced road. In this case, as the brake switch 14 is OFF, when the routine for estimating the vehicle speed $V_X$ of FIG. 5 is executed, the processing of the step S7 to the steps S8–S10 is performed. The minimum value of the filter outputs $V_{f_{FL}}$, $V_{f_{FR}}$, $V_{f_R}$ of the wheel speeds $V_{W_{FL}}$, $V_{W_{FR}}$, $V_{W_R}$ is therefore selected as the select-low wheel speed $V_{W_L}$, and is stored as the estimated wheel speed $V_X$ in the memory 20c.

By setting the select-low wheel speed $V_{W_L}$ equal to the estimated wheel speed $V_X$, the filter output which is the smaller of the wheel speeds $V_{f_{FL}}$ and $V_{f_{FR}}$ of the front wheels 1FL, 1FR (which are not drive wheels) corresponding to the vehicle speed, is selected as the estimated vehicle speed $V_X$ even when the rear wheels (which are drive wheels) slip so that the wheel speed $V_{W_R}$ has increased. A precise vehicle speed that is not subject to the effect of slip of the drive wheels, can therefore be estimated.

In the wheel cylinder pressure estimating routine of FIG. 6, as the vehicle is in the non-braking condition, control signals $EV_i$, $AV_i$, $MR_i$ are all 0, and the processing from the step S42 to the step S46 is performed. Here, as the vehicle is in the low speed running condition, the estimated wheel cylinder pressure $P_{i(n-1)}$ on the immediately preceding occasion is 0, and as the brake pedal is not depressed, the master cylinder pressures $P_{MCF}$, $P_{MCR}$ on the present occasion are also 0. The estimated pressure increase amount $\Delta P_{iA}$ is therefore 0, and the estimated wheel cylinder pressure $P_{i(n)}$ is 0.

Figure 4:
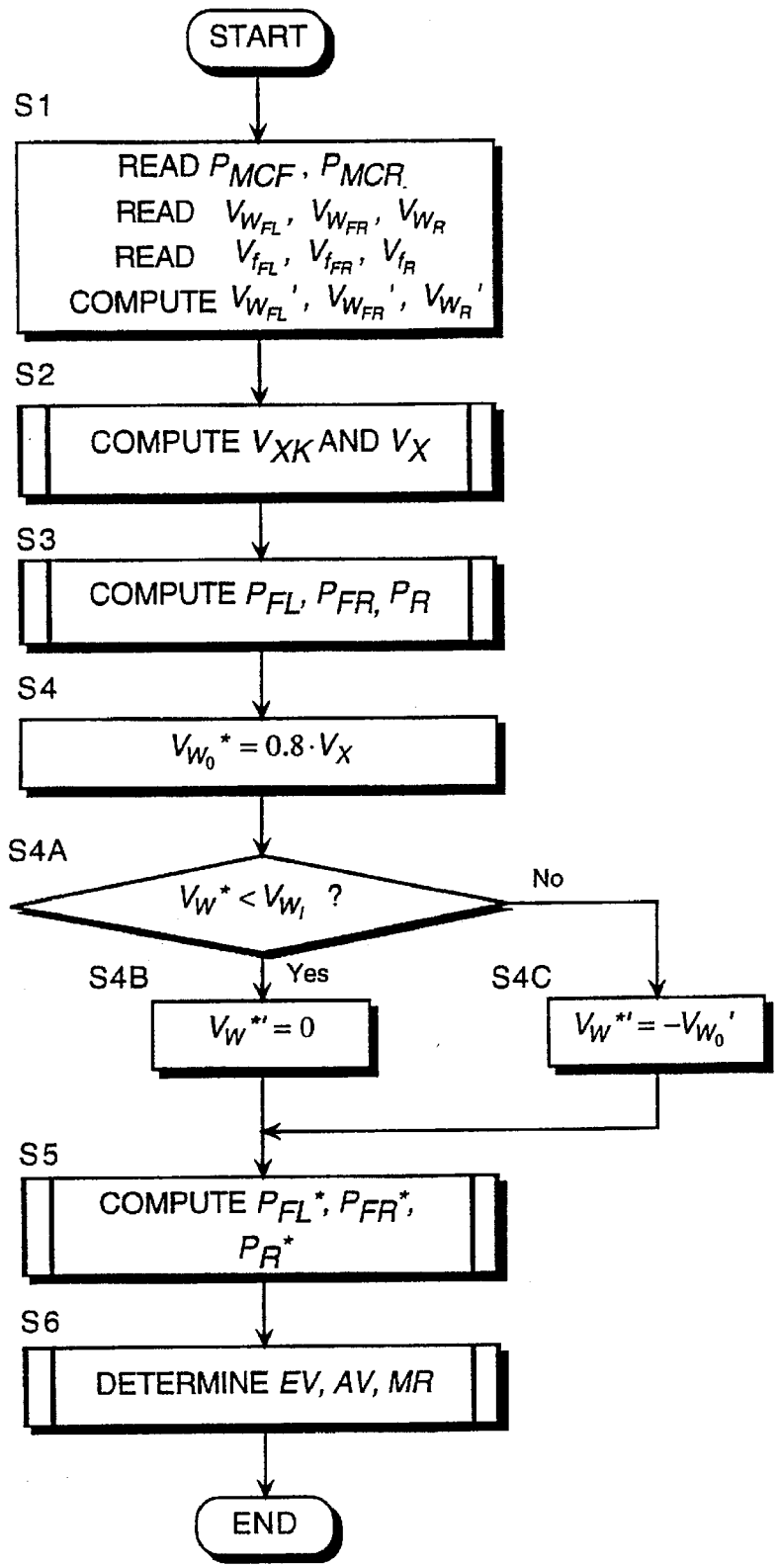
FIG. 4 is a flowchart describing an antiskid control process according to this invention.

Further, as the target wheel speed $V_W^*$ computed in the step S4 of FIG. 4 is 80% of the estimated vehicle speed $V_X$ as shown in FIG. 9(a), it is less than the select-low wheel speed $V_{W_L}$. Processing therefore proceeds from the step S4A to the step S4C, and the target wheel deceleration $V_W^*$ is set to a predetermined value $-V_{W_0}'$ as shown in FIG. 9(b).

As a result, $V_W^* \leq V_{W_l}$, the wheel deceleration $V_{W_l}'$ is 0 and the target wheel deceleration $V_W^*$ is a negative predetermined value $-V_{W_0}'$. Hence, the target pressure increase/decrease $\Delta P_i$ in the calculation of equation (10), performed in the step S51 of the flowchart of the target wheel cylinder pressure computation of FIG. 7, is a positive value. This is also shown in FIG. 9(c).

As $V_W^* \leq V_{W_l}$ and $\Delta P_i$ is a positive value, the determination result of the step S54 is affirmative, and the routine proceeds to the step S55.

Further, as the slow pressure increase/decrease period m is set to 1 in the actuator control routine of FIG. 8 as described hereinafter, the routine proceeds to the determination of the step S56A after the determination of the step S55. Here, as the target pressure increase/decrease $\Delta P_i$ is larger than the reference value $P_0$, the routine proceeds to a step S56B. As the pressure increase/decrease amount setting permission flag FLAG is set to 1 as described hereinafter in the actuator processing, the routine proceeds to the step S56E and the computation of equation (11) is performed.

In this case, as the estimated wheel cylinder pressure $P_{PEAK}$ immediately before the pressure begins decreasing, is cleared as described hereinafter in the actuator processing, $(P_{PEAK}-P_i)/2<0$, and the $\Delta P_i$ calculated in the step S51 is selected as the target pressure increase/decrease amount.

In the step S57, the estimated wheel cylinder pressure $P_i$ is 0, and as the target pressure increase/decrease amount $\Delta P_i$ is a positive value.

$P_i+\Delta P_i=\Delta P_i$ is set to the target wheel cylinder pressure $P_i^*$. However, as the master cylinder pressures $P_{MCF}$, $P_{MCR}$ are both 0, the target wheel cylinder pressure $P_i^*$ is 0 in the step S58, and this value is stored in the memory 20c.

Next, the actuator control routine of FIG. 8 is executed, but as the target wheel cylinder pressure $P_i^*$, and the master cylinder pressures $P_{MCF}$, $P_{MCR}$ are all 0, the determination result of the step S61 is affirmative, and the routine proceeds to the step S65 via the steps S62–S64. In this process AS is reset to 0, the pressure increase/decrease time $T_p$ is set to 1, the estimated wheel cylinder pressure $P_{PEAK}$ immediately before the pressure begins decreasing is reset to 0, and the pressure increase/decrease amount setting permission flag FLAG is set to 1. The slow pressure increase/decrease period m is also set to 1 in the step S64.

In the step S65, as $T_p=1$, the routine proceeds to the step S66, and $T_p$ is reset to 0. In the step S67, a pressure increase signal at which EV and AV are both 0 is output. The wheel cylinders 2FL, 2FR, 2RL, 2RR are therefore connected to the master cylinder 5. However, as the brake pedal 14 is not depressed, the pressure of the master cylinder 5 is 0, and the pressures of the wheel cylinders 2FL, 2FR, 2RL, 2RR are also 0. In other words, no braking force is generated, and the non-braking state continues.

From the fixed speed running state, the brake pedal 14 is depressed at a time $t_1$ in FIG. 9. In this case, when the vehicle speed estimating routine of FIG. 5 is executed, the routine proceeds from the step S7 to the step S11. As a result, the select-high wheel speed $V_{W_H}$ is selected, and the wheel deceleration $V_{W_H}'$ is computed in the step S12 based on this.

Immediately after braking begins, a flag F1 showing whether or not the wheel deceleration $V_{W_H}'$ exceeds the set deceleration $-D_S$ is 0, the determination result of the step S13 is non-affirmative, and the routine proceeds to the step S14. At this time, the wheel deceleration $V_{W_H}'$ does not reach the set deceleration $-D_S$, so the determination result of the step S14 is also non-affirmative, and the select-high wheel speed $V_{W_H}$ becomes equal to the vehicle speed slop $V_{XK}$ in the step S15.

Due to the depression of the brake pedal 14, the master cylinder pressures $P_{MCF}$, $P_{MCR}$ increase sharply. As the estimated wheel cylinder pressure $P_i$ on the immediately preceding occasion is 0, the estimated pressure increase $\Delta P_{iA}$ computed in the wheel cylinder pressure estimating routine of FIG. 6 depends only on the master cylinder pressures $P_{MCF}$, $P_{MCR}$, and the estimated wheel cylinder pressure $P_{i(n)}$ on the present occasion becomes equal to the master cylinder pressures $P_{MCF}$, $P_{MCR}$.

Hence, when the target wheel cylinder pressure computation routine of FIG. 7 is executed, the wheel deceleration $V_{W_l}'$ increases. The target pressure increase/decrease amount $\Delta P_i$ still retains a positive value at this time as shown in FIG. 9(c), and as the estimated wheel cylinder pressure $P_i$ has increased, the target wheel cylinder pressure $P_i^*$ computed in the step S57 is a larger value than the master cylinder pressures $P_{MCF}$, $P_{MCR}$. However in the step S58, the master cylinder pressures $P_{MCF}$, $P_{MCR}$ are set equal to the target wheel cylinder pressure $P_i^*$, and this value is stored in the memory 20c.

In the actuator control routine of FIG. 8, therefore, the target wheel cylinder pressure $P_i^*$ is identical to the master cylinder pressures $P_{MCF}$, $P_{MCR}$, and the pressures of the actuators 6FL, 6FR, 6R continue increasing. Consequently, the wheel speeds $V_{W_l}$ of the rear wheels 1FL, 1FR, 1RL, 1RR begin decreasing at a time $t_1$ as shown in FIG. 9(a). In FIG. 9, for the sake of simplicity, it is assumed that all of the wheels behave in the same way.

At a time $t_2$, the wheel deceleration $V_{W_H}'$ reaches the set deceleration $-D_S$. As a result, in the vehicle speed estimating routine of FIG. 5, the processing of the steps S16–S18 is performed after the step S14. In other words, the select-high wheel speed $V_{W_H}$ at this time is stored as an initial sampling wheel speed $V_{S_0}$ in the memory 20c, the elapsed time T is cleared, and the flag F1 showing whether or not the vehicle is in the braking state is set to 1. In the step S15, the estimated vehicle speed $V_X$ is maintained at the select-high wheel speed $V_{W_H}$.

Hence when this routine is executed on the next occasion, since the flag F1 showing that the wheel deceleration has exceeded the predetermined value is 1, the routine proceeds from the step S13 to the step S18A, and after the elapsed time T is incremented, the determination of the step S19 is performed. As the antiskid control flag AS is still reset to 0, the routine proceeds to the determination of the antiskid control start flag F2 in the step S27. However, as the flag F2 is also 0, the determination of the step S29 is performed. While the pressure of the wheel cylinder is increasing, the select-high wheel speed $V_{W_H}$ is less than the estimated vehicle speed $V_X$ stored on the immediately preceding occasion, so in the step S29, $V_{W_H} < V_X$ and the routine proceeds to the step S30. Here the result of subtracting a value, obtained by multiplying the vehicle speed slop $V_{XK}$ (=set value $V_{XK_0}$) by the sampling time $\Delta t$, from the select-high wheel speed $V_{W_H}$, is stored as a new estimated vehicle speed $V_X$ in the memory 20c. Hence, the estimated vehicle speed $V_X$ is gradually decreased with a slope of the set value $V_{XK_0}$ as shown by the dotted line in FIG. 9(a). The target wheel speed $V_W^*$ also decreases accordingly, and the wheel deceleration $V_{W_H}'$ also increases in a negative direction as shown in FIG. 9(b).

The target pressure increase/decrease amount $\Delta P_i$ computed in the step S51 of the target wheel cylinder pressure computation routine of FIG. 7, therefore decreases as shown in FIG. 9(c), and after it has become 0 at a time $t_3$, it increases further in a negative direction.

During this time, when the wheel speed estimating routine of FIG. 5 is executed, the processing from the step S13 to the step S30 is performed via the steps S19, S29, and the estimated wheel speed $V_X$ decreases with the vehicle speed slope $V_{XK_0}$.

When the target pressure increase/decrease amount $\Delta P_i$ becomes 0 at a time $t_3$, the estimated wheel cylinder pressure $P_i$ is equal to the target wheel cylinder pressure $P_i^*$, and the estimated wheel cylinder pressure $P_i$ stops increasing. On the other hand as the master cylinder pressures $P_{MCF}$, $P_{MCR}$ continue increasing as shown by the dotted line in FIG. 9(e), in the actuator control routine of FIG. 8, the target wheel cylinder pressure $P_i^*$ is not identical to the master cylinder pressures $P_{MCF}$, $P_{MCR}$. As a result, the routine proceeds from the step S61 to the step S72, and by subtracting 1 from the slow pressure increase/decrease period m which was set to 1 on the immediately preceding occasion, the slow pressure increase/decrease period m becomes 0. The routine therefore proceeds from the step S73 to the step S74, and as the difference $P_{err}$ between the target wheel cylinder pressure $P_i^*$ and the estimated wheel cylinder pressure $P_i$ is 0, the processing from the step S75 to the step S76 is also executed. In the step S78, the computation of the aforesaid equation (14) is performed, but as $P_{err}$ is 0, the pressure increase/decrease time $T_p$ is 0. The routine therefore proceeds from the step S78 to the step S79, the slow increase/decrease period m is set to 1, and the routine reaches the step S68 via the step S65.

In the step S68, the inflow valve 8 and outflow valve 9 are shut, a hold signal wherein AV=0 at EV=1 is output, the connection between the wheel cylinders 2FL, 2FR, 2RL, 2RR and the master cylinder 5 is cut, and the wheel cylinders 2FL, 2FR, 2RL, 2RR maintain their pressures.

In this hold mode, in the wheel cylinder pressure estimating routine of FIG. 6, the routine is terminated after the step S42, and the wheel cylinder pressure $P_i$ on the immediately preceding occasion is maintained.

Further, when the target wheel cylinder pressure computation routine of FIG. 7 is executed, the target pressure increase/decrease amount $\Delta P_i$ computed in the step S51 increases in the negative direction as shown in FIG. 9(c). While the target wheel speed $V_W^*$ is equal to or below the wheel speed $V_{W_l}$, therefore, the target pressure increase/decrease $\Delta P_i$ is limited to 0 in the step S53.

In the actuator control routine of FIG. 8 on the immediately preceding occasion, the slow pressure increase/decrease period m was set to 1, so the routine proceeds to the step S56A due to the determination of the step S55. As the pressure increase/decrease amount setting permission flag FLAG is still set to 1 in the step S63A of the actuator control routine of FIG. 8, the routine proceeds to the steps S56E–S58 as a result of the determination of the step S56A.

Here, as the estimated wheel cylinder pressure $P_{PEAK}$ is cleared in the step S63A of the actuator control process, $(P_{PEAK} - P_i)/2 > 0$, and the target pressure increase/decrease amount $\Delta P_i$ is 0. The master cylinder pressures $P_{MCF}$, $P_{MCR}$ which are still increasing are also larger than the present estimated wheel cylinder pressure $P_i$. The present estimated wheel cylinder pressure $P_i$ is therefore stored as the target wheel cylinder pressure $P_i^*$ without modification.

Hence, when the actuator control routine of FIG. 8 is executed, a hold signal is output in the step S68 as on the immediately preceding occasion when the routine is executed.

When the wheel speed $V_{W_l}$ decreases and falls below the target wheel speed $V_W^*$ at a time $t_4$, the target wheel deceleration $V_W^{*'}$ is set to 0 in a step S4B of the main routine of FIG. 4.

In this state, the target wheel cylinder pressure computation routine of FIG. 7 is executed. The target pressure increase/decrease amount $\Delta P_i$ computed in the step S51 continues to increase in a negative direction as shown in FIG. 9(c), and the target wheel speed $V_W^*$ becomes larger than the wheel speed $V_{W_l}$. Processing is therefore performed in the order of the steps S52, S55, S56A, S56 and S58. The target wheel cylinder pressure $P_i^*$ assumes a value obtained by adding the target pressure increase/decrease amount $\Delta P_i$, which has a negative value to the estimated wheel cylinder pressure $P_i$.

In the actuator control routine of FIG. 8, the computed $P_{err}$ of the step S74 becomes a negative value, and the calculation of the aforesaid equation (15) is performed in the step S77.

As a result, a negative pressure increase/decrease time $T_p$ is set according to the estimated wheel cylinder pressure $P_i$ before the pressure began decreasing. Next, after the step S78, the slow pressure increase/decrease period m is set to the predetermined value $m_0$ in the step S80. Also, after the step S65, the antiskid control flag AS is set to 1 in the step S69. In the step S70, 1 is added to the negative pressure increase/decrease time $T_p$ and stored, and in the step S71, a pressure decrease signal wherein EV=1, AV=1, MR=1 is output As a result, the inflow valve 8 is shut, the outflow valve 9 opens and the pump 10 begins operating. Working oil in the wheel cylinders 2FL, 2FR, 2RL, 2RR is forcibly discharged to the master cylinder 5, and the cylinder pressure begins to fall as shown in FIG. 9(e).

At the time the pressure starts to decrease, the elapsed time $T_G$ is still cleared due to the output of the pressure increase signal on the immediately preceding occasion. After pressure starts to decrease in the step S71B, therefore, count of the elapsed time $T_G$ begins, the estimated wheel cylinder pressure $P_i$ is stored as the estimated wheel cylinder pressure $P_{PEAK}$ immediately before the pressure started to decrease, and the pressure increase/decrease amount setting permission flag FLAG is cleared as shown in FIG. 9(g).

In this way, pressure decrease begins. While the pressure is decreasing, the steps S42 to S48–S50 of the estimated wheel cylinder pressure computation routine of FIG. 6 are performed. In other words, the estimated pressure decrease amount $\Delta P_{iD}$ is calculated based on the estimated wheel cylinder pressure $P_{i(n-1)}$ on the immediately preceding occasion, $\Delta P_i$ is subtracted from $P_{i(n-1)}$ so as to compute the estimated wheel cylinder pressure $P_{i(n)}$ on the present occasion, and this value is stored.

In the target wheel cylinder pressure computation routine of FIG. 7, as the target pressure increase/decrease amount $\Delta P_i$ calculated in the step S51 is a negative value as shown in FIG. 9(c), $\Delta P_i < P_0$, and the routine jumps from the step S56A to the step S57. A value obtained by adding a negative pressure increase/decrease amount $\Delta P_i$ to the estimated wheel cylinder pressure $P_i$ is therefore set as the target wheel cylinder pressure $P_i^*$.

Further, as the antiskid control flag AS is set to 1 in the step S69 of the antiskid control routine of FIG. 8, the elapsed time T is incremented in the step S18A of the vehicle speed estimating routine of FIG. 5, and the processing of the steps S19–S21B is performed. In other words, in the step S20, the flag F2 showing whether or not antiskid control has begun is set to 1. As the flags F3 and F4 are both still reset, the routine proceeds from the step S21 via the step S21A to the step S21B. As the acceleration $V_{W_H}'$ of the select-high wheel speed $V_{W_H}$ is still negative, a value obtained by multiplying the vehicle speed slope $V_{XK}$ by the sampling time $\Delta t$ is subtracted from the select-high wheel speed $V_{W_H}$ so as to obtain the estimated vehicle speed $V_X$ in the step S30, which is stored. In this way, as the estimated vehicle speed $V_X$ decreases with a predetermined slope, the value of $K_1 \cdot V_X$ which is the basis for determining the elapsed time $T_G$ also decreases as shown in FIG. 9(f).

When the actuator control routine of FIG. 8 is executed, the elapsed time $T_G$ in the routine on the immediately preceding occasion is 1, i.e. it is set to a positive value, so the routine proceeds to the step S60B and the elapsed time $T_G$ is incremented. Further, as the target wheel cylinder pressure $P_i^*$ is less than the estimated wheel cylinder pressure $P_i$, the decreasing pressure mode continues via the steps S75 to S77. Also as the elapsed time $T_G$ is a positive value, the routine is terminated after the step S71A without going through the step S71B.

Due to the continuation of the decreasing pressure mode, the wheel speed $V_{W_l}$ increases as shown in FIG. 9(a) and the target pressure increase/decrease amount $\Delta P_i$ again becomes 0 at a time $t_5$. As a result, $P_{err}$ calculated by the step S74 of the actuator control routine of FIG. 8 is 0. The routine then proceeds from the step S75 to the step S76, and the pressure increase/decrease time $T_p$ is set to 0. The subsequent processing therefore proceeds from the step S65 to the step S68, the actuators 6R, 6FL, 6FR change over from the decreasing pressure mode to the hold mode, and the wheel cylinder pressure is held at a fixed value as shown in FIG. 9(e).

In this hold mode, the estimated wheel cylinder pressure $P_i$ in the wheel cylinder pressure estimating routine of FIG. 6 is held at its present value as described hereintofore. Also in the target wheel cylinder pressure computation routine of FIG. 7, the target pressure increase/decrease amount $\Delta P_i$ increases in a positive direction as shown in FIG. 9(c), but as the target wheel speed $V_W^*$ is larger than the wheel speed $V_{W_l}$, the target pressure increase/decrease amount $\Delta P_i$ is limited to 0 in the step S53, and the target wheel cylinder pressure $P_i^*$ is held at its value on the immediately preceding occasion.

At a time $t_6$, when the target wheel speed $V_W^*$ is identical to the wheel speed $V_{W_l}$, the condition of the step S54 in the target wheel cylinder pressure computation routine of FIG. 7 is satisfied, hence the target pressure increase/decrease amount $\Delta P_i$ is not limited to 0 and the processing after the step S55 is performed.

In this case, the target pressure increase/decrease amount $\Delta P_i$ is a large positive value as shown in FIG. 9(c), so as a result of the determination of the step S56A, the routine proceeds to the step S56B. Also, FLAG is set to 0 at the time $t_4$ when pressure begins decreasing on the immediately preceding occasion, and as $T_G < K_1 \cdot V_X$, the routine proceeds from the step S56B via the step S56C so as to reach the step 56D. Here, the aforesaid FLAG is set to 1 as is also shown in FIG. 9(g), and the routine proceeds to the step S56E.

In the step S56E, the computation of equation (11) is performed. Herein, $P_{PEAK}$ is the estimated wheel cylinder pressure $P_i$ at the time $t_4$ when the pressure begins decreasing. Half of the difference between this $P_{PEAK}$ and the present estimated wheel cylinder pressure $P_i$ is compared with the target pressure increase/decrease amount $\Delta P_i$ computed in the step S51, and the larger of the two is used as the target pressure increase/decrease amount $\Delta P_i$. Here, the former of the two is used as shown in FIG. 9. The difference between the $P_{PEAK}$ and the present estimated wheel cylinder pressure $P_i$ is a total pressure decrease amount during the pressure decrease on the immediately preceding occasion. Hence, when the vehicle continues to travel on a road surface having a high frictional coefficient, the target pressure increase/decrease amount $\Delta P_i$ is determined based on this total pressure decrease amount so as to advance the time at which the wheel cylinder pressure after pressure decrease reaches the lock pressure, and thereby reduce the braking distance.

When the actuator control routine of FIG. 8 is performed, therefore, the difference $P_{err}$ computed in the step S74 is a positive value, and the estimated wheel cylinder pressure $P_i$ increases after the time $t_6$ as in the case of the period from the time $t_1$ to the $t_3$.

Figure 3:
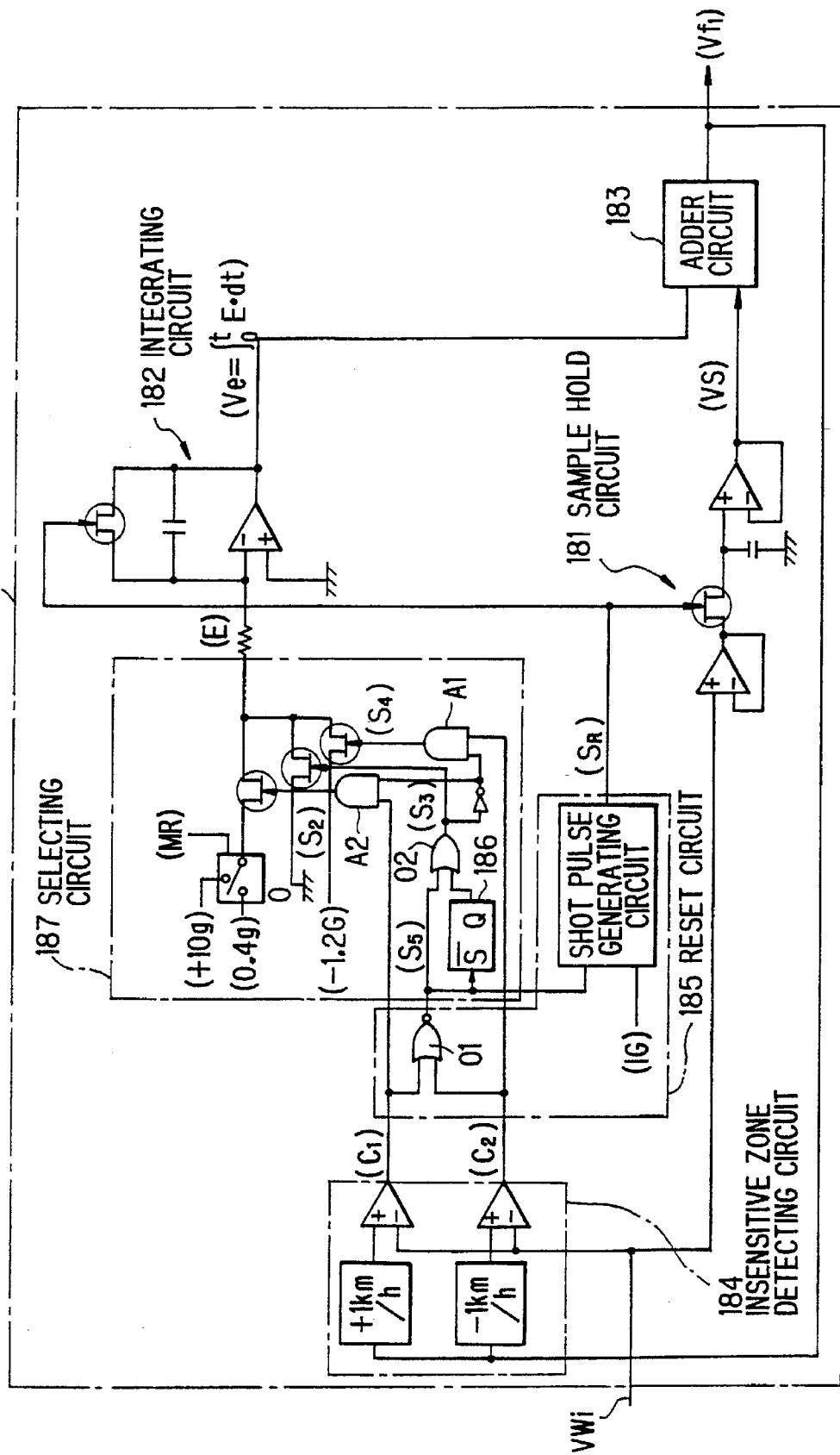
FIG. 3 is a circuit diagram of a wheel speed filters according to this invention.

When the output $V_{fi}$ of the wheel speed filters 18FL, 18FR, 18R and the wheel speed $V_{W_i}$ becomes effectively identical due to recovery of the wheel speed $V_{W_i}$, the filter output $V_{fi}$ sharply increases. This is because, in the selection circuit 187 of the wheel speed filters 18FL, 18FR, 18R shown in FIG. 3, a voltage corresponding to +10 G is selected after a set delay time of an off delay timer 186 has elapsed, and this voltage is supplied to the integrating circuit 182. As this filter output $V_{fi}$ is selected as the select-high wheel speed $V_{W_H}$, the determination result of the step S21B in the vehicle speed estimating routine of FIG. 5 is affirmative, and the flag F4 is set to 1 in the step S21C. When this routine is executed on the next occasion, therefore, the determination result of the step S21A is affirmative, and the routine proceeds to the step S22. Here, as $V_{W_H}' > -D_S$, the subtraction routine performed on the estimated vehicle speed $V_X$ continues from the step S29 to the step S30.

At a time $t_7$, when the select-high wheel speed $V_{W_H}$ exceeds the estimated vehicle speed $V_X$, $V_{W_H} \geq V_X$ in the step S29 of the vehicle speed estimating routine of FIG. 5, the flag F3 is reset to 0 in the step S31, and the select-high wheel speed $V_{W_H}$ is set to the estimated vehicle speed $V_X$ in the step S15.

On the other hand the wheel speed $V_{W_i}$ again decreases as shown in FIG. 9(a) due to increase of the wheel cylinder pressure $P_i$, and at a time $t_8$, the deceleration $V_{W_H}'$ of the select-high wheel speed $V_{W_H}$ exceeds the set value $-D_S$. As a result, in the vehicle speed estimating routine of FIG. 5, the present select-high wheel speed $V_{W_H}$ is stored as a sampling wheel speed $V_{S(n)}$ in the step S23 after the step S22.

Next, in the step S24, the computation of the aforesaid equation (5) is performed so as to compute the vehicle speed slope $V_{XKP}$, and this is stored as the vehicle speed slope $V_{XK}$ in the step S25.

Further, the flag F3 is reset to 1 and the flag F4 is reset to 0 in the step S26.

The vehicle speed slope $V_{XKP}$ computed in the step S24 is a value that depends on the decrease of actual vehicle speed, and it is a smaller value than the predetermined value $V_{XK}$, as shown in FIG. 9(d). Subsequently, therefore, the computed value $V_{XKP}$ is used as the vehicle speed slope $V_{XK}$.

In this state, when the wheel cylinder pressure estimating routine of FIG. 6 is executed, the control signal on the immediately preceding occasion is a pressure increase signal, the estimated wheel cylinder pressure on the immediately preceding occasion is a relatively large value, and as the master cylinder pressures $P_{MCF}$, $P_{MCR}$ continue to have large values, the estimated pressure increase amount $\Delta P_{iA}$ becomes a predetermined value. The estimated wheel cylinder pressure $P_i$ therefore is in a slow pressure increase condition which alternates between pressure increase and hold as shown in FIG. 9(e).

In this state, the wheel speed $V_{W_i}$ begins to decrease as shown in FIG. 9(a), and as the target pressure increase amount $\Delta P_i$ decreases accordingly as shown in FIG. 9(c), the difference between the target wheel cylinder pressure $P_i^*$ and the estimated wheel cylinder pressure $P_i$ becomes less.

At a time $t_9$ the target pressure increase amount $\Delta P_i$ becomes 0, the system enters the hold state, then at a time $t_{10}$ the system changes over to pressure decrease, and measurement of the elapsed time $T_G$ begins. Subsequently at a time $t_{11}$ the system returns to the hold state, and at a time $t_{12}$ changes over to the pressure increase state. In this case too, $T_G$ is far smaller than the predetermined value $K_1 \cdot V_X$, so the calculation of the step S56E in the target wheel cylinder pressure computation routine of FIG. 7 continues, and the pressure increase amount is set based on the total pressure decrease amount on the immediately preceding occasion.

Subsequently, at a time $t_{13}$ the system enters the hold state, and at a time $t_{14}$ it changes over to the pressure decrease state. The wheel cylinder pressure repeats this pressure increase/decrease behavior until the vehicle stops.

After the vehicle stops, when the depression of the brake cylinder 4 is stopped and the vehicle enters the non-braking state, the master cylinder pressure $P_{MCF}$, $P_{MCR}$ are 0. When the wheel cylinder pressure estimating routine of FIG. 6 is executed, the target wheel cylinder pressure $P_i^*$ is therefore set to the master cylinder pressures $P_{MCF}$, $P_{MCR}$ in the step S57.

As a result, in the actuator control routine of FIG. 8, non-braking state control is performed from the step S62 via the step S65 to the step S67A.

Hence, when the vehicle is traveling on a road having a high frictional coefficient, the estimated pressure increase $\Delta P_i$ when the pressure is again increasing is determined based on the total pressure decrease amount on the immediately preceding occasion so as to advance the time at which the wheel cylinder pressure after pressure decrease reaches the lock pressure, and thereby reduce the braking distance.

Next referring to FIG. 10, the control will be described for the case where the vehicle brakes fairly sharply on a road having a high frictional coefficient, and the road surface changes to a wet or icy road.

At the time $t_1$ when the vehicle is traveling on a road having a high frictional coefficient, when the brake pedal is depressed fairly sharply, the wheel cylinder pressure $P_i$ increases sharply according to the sharp increase of the master cylinder pressures $P_{MCF}$, $P_{MCR}$ as shown in FIG. 10(b). The wheel speed $V_{W_i}$ and vehicle speed $V_X$ both decrease accordingly, and at the time $t_2$, the system enters the hold state. At the time $t_3$, the system changes over to the pressure decrease state and after the wheel speed $V_{W_i}$ has recovered, the system again enters the hold state at the time $t_4$. At the time $t_5$, the system changes over to the slow pressure increase state, and the wheel speed $V_{W_i}$ again decreases.

During the period from the time $t_3$ when the pressure begins decreasing to the time $t_5$ when pressure increase recommences, in the actuator control routine of FIG. 8, the elapsed time $T_G$ is a small value as shown in FIG. 10(d). On the other hand, as the estimated vehicle speed $V_X$ is a large value, the determination value is large as shown in FIG. 10(d), and $T_G < K_1 \cdot V_X$. Consequently in the target wheel cylinder pressure computation routine of FIG. 7, the determination of the pressure increase amount is performed in the step S56E based on the total pressure decrease amount on the immediately preceding occasion.

Assume that this situation is repeated several times, and when the system enters the pressure decrease state at the time $t_8$, the road surface frictional coefficient sharply changes from a high frictional coefficient to a low frictional coefficient. In this case, due to the sharp decrease of road surface frictional coefficient, the wheel speed $V_{w_i}$ sharply decreases so as to approach the lock state as shown in FIG. 10(a).

At this time, in the actuator control routine of FIG. 8, the processing of the step S65 to the steps S69–S71A is performed. As on the immediately preceding occasion the system was in the hold state, the elapsed time $T_G$ is 0, and as a result of the determination of the step S71A, the processing of the step S71B is performed. Herein, the elapsed time $T_G$ is set to 1, the estimated wheel cylinder pressure $P_i$ at that time is stored as the estimated wheel cylinder pressure $P_{PEAK}$ when the pressure begins to decrease, and the determination flag FLAG is reset to 0.

When the wheel cylinder pressure estimating routine of FIG. 6 is executed, the processing of the step S48 and subsequent steps is performed as the determination result of the step S42. Herein, the estimated wheel cylinder pressure $P_{i(n-1)}$ on the immediately preceding occasion is a relatively high value as shown in FIG. 10(b), so the estimated pressure decrease amount $\Delta P_{iD}$ is a relatively large value, and the estimated wheel cylinder pressure $P_i$ decreases sharply.

On the other hand in the target wheel cylinder pressure computation routine of FIG. 7, the wheel deceleration $V_{w_i}'$ also increases largely in the negative direction due to the sharp decrease of wheel speed $V_{w_i}$. The target pressure increase/decrease $\Delta P_i$ computed in the step S51 is therefore a large negative value, the routine jumps from the step S56A to the step S57, and the target wheel cylinder pressure $P_i^*$ largely decreases compared with the immediately preceding occasion.

In the actuator control routine of FIG. 8, therefore, the step S77 is performed after the step S74, and the pressure decrease time $T_p$ is set according to the estimated wheel cylinder pressure before the pressure begins decreasing. As a result, although pressure decrease is performed, the wheel speed $V_{w_i}$ goes on decreasing further due to the sharp decrease of frictional coefficient of the road surface, and the estimated wheel cylinder pressure $P_i$ and target wheel cylinder pressure $P_i^*$ continue falling.

However, when the wheel speed $V_{w_i}$ starts to recover at the time $t_7$, the target pressure increase/decrease amount $\Delta P_i$ computed in the step S51 of the target wheel cylinder pressure computation routine of FIG. 7 has a small value. As a result, the decrease of target wheel cylinder pressure $P_i^*$ becomes gradual, the estimated pressure decrease amount $\Delta P_{iD}$ in the wheel cylinder pressure estimating routine of FIG. 6 also decreases according to the decrease of the estimated wheel cylinder pressure $P_{i(n-1)}$ on the immediately preceding occasion, and the rate of decrease of the estimated wheel cylinder pressure $P_i$ becomes small.

The pressure decrease state is therefore prolonged due to the rapid decrease of frictional coefficient of the road surface, the elapsed time $T_G$ measured in the actuator control routine of FIG. 8 is a large value, and the determination result $K_1 \cdot V_X$ is exceeded at the time $t_8$. However, as the pressure is decreasing at the time $t_8$, the target pressure decrease amount $\Delta P_i$ computed in the step S51 of the target wheel cylinder pressure computation routine of FIG. 7 is a negative value, and the routine jumps from the step S56A to the step S57. A comparison of the elapsed time $T_G$ and the determination value $K_1 \cdot V_X$ is therefore not performed here.

Subsequently, when the target wheel cylinder pressure computation routine of FIG. 7 is performed at the time $t_9$, the wheel speed $V_{w_i}$ becomes larger than the target wheel speed $V_w^*$, and the target pressure increase/decrease amount $\Delta P_i$ computed in the step S51 is a large positive value. Hence, after the step S54, the processing of the steps S55, S56A and S56B is performed, and as the determination flag FLAG is reset to 0, a comparison of the elapsed time $T_G$ and determination result $K_1 \cdot V_X$ is performed in the step S56C. Here, as the elapsed time $T_G$ is larger than the determination result $K_1 \cdot V_X$ as shown in FIG. 10(d), the routine immediately jumps to the step S57. The setting of the pressure increase amount according to the total pressure decrease on the immediately preceding occasion in the step S56E is therefore not performed, and the target wheel cylinder pressure $P_i^*$ is determined from the target pressure increase/decrease amount $\Delta P_i$ computed in the step S51, i.e. from the target pressure increase/decrease amount $\Delta P_i$ based on the actual wheel slip amount.

In the actuator control routine of FIG. 8, therefore, the difference $P_{err}$ between the target wheel cylinder pressure $P_i^*$ and estimated wheel cylinder pressure $P_i$ becomes small, and the pressure increase hold time is shorter. Consequently, the increase of estimated wheel cylinder pressure $P_i$ does not become excessive and remains within a suitable range as shown in FIG. 10(b). This means that sharp decreases of the wheel speed $V_{w_i}$ are suppressed and good antiskid control is performed according to the low frictional coefficient of the road surface as shown in FIG. 10(a).

As described hereintofore, this invention, by focusing on the increase of elapsed time from beginning of pressure decrease to beginning of pressure increase when the frictional coefficient of the road surface on which the vehicle is traveling changes from a high coefficient to a low coefficient, detects the sharp drop in the frictional coefficient of the road surface. Further, instead of determining a pressure increase amount based on the total pressure decrease on the immediately preceding occasion when there is such a rapid decrease of frictional coefficient, this is determined according to the actual wheel slip amount. The wheel slip amount therefore does not become excessive, and effective antiskid control is performed.

Further, the variation of wheel speed becomes larger and the elapsed time from pressure decrease to pressure increase becomes longer the larger the vehicle speed, however in this invention the determination value of the elapsed time $T_G$ is arranged to be larger corresponding to the estimated vehicle speed $V_X$, so highly efficient antiskid control that takes account of this tendency is performed.

Figures 11A, 11B:
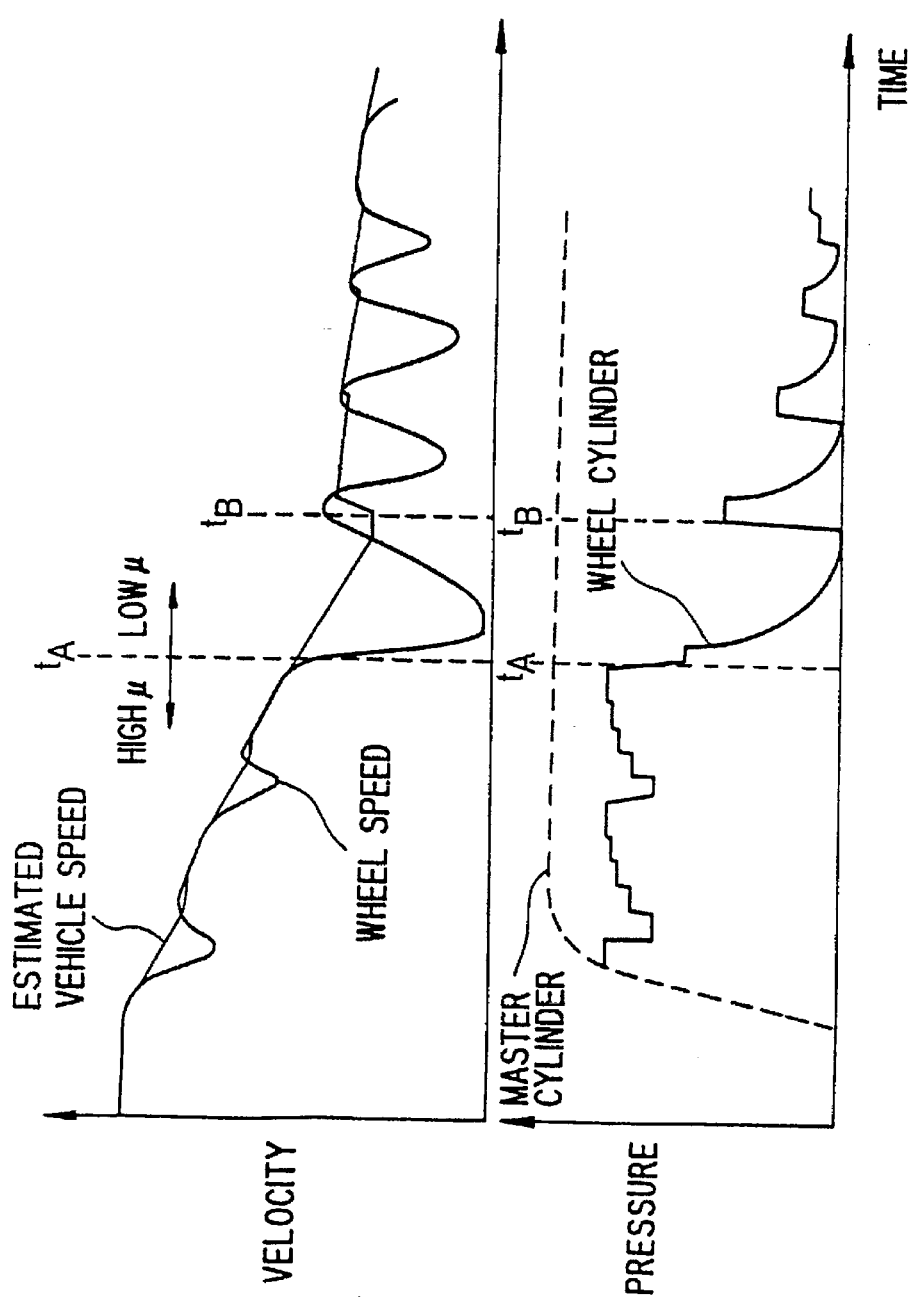
FIGS. 11(a) and 11(b) are a timing chart showing antiskid control according to the prior art on a running surface where the road surface frictional coefficient varies sharply.

In conventional antiskid control where the pressure increase amount is always determined based on the total pressure decrease on the immediately preceding occasion, as shown in FIG. 11, after the frictional coefficient of the road surface on which the vehicle is travelling changes over from high to low at a time $t_A$ and the pressure again begins increasing at a time $t_B$, the target wheel cylinder pressure $P_i^*$ is a large value and the estimated wheel cylinder pressure $P_i$ becomes excessive as shown in FIG. 11(b). As a result, the deceleration of the wheel speed $V_{w_i}$ increases as shown in FIG. 11(a) and the wheel slip amount increases. A considerable time is required for this to become steady, and during this time the stability of the vehicle declines.

In the aforesaid embodiment, the wheel speed filters 18FL, 18FR, 18R were connected to the output side of the wheel speed computation circuits 15FL, 15FR, 15R, and the vehicle speed slope $V_{XK}$ and estimated vehicle speed $V_X$ were computed according to these filter outputs. Alternatively however, the wheel speed filters 18FL, 18FR, 18R may be omitted, and the vehicle speed slope $V_{XK}$ and estimated vehicle speed $V_X$ computed based on $V_{W_{FL}}$, $V_{W_{FR}}$, $V_{W_R}$ output by the wheel speed computation circuits 15FL, 15FR, 15R.

Instead of estimating the pressures of the wheel cylinders 2FL, 2FR, 2RL, 2RR by the estimated wheel cylinder pressure computation routine, the wheel cylinder pressures of the wheel cylinders 2FL, 2FR, 2RL, 2RR can be directly measured by pressure sensors, and the actuators 6FL, 6FR, 6R controlled according to the detected pressures and the target wheel cylinder pressure.

Further, according to the aforesaid embodiment, a 3-channel antiskid brake system was described using a single sensor 3R for detecting the wheel speed of the rear wheels. It will of course be understood that this invention applies also to a 4-channel device where the wheel speeds of the left and right rear wheels are detected separately, and the cylinder pressures of the left and right rear wheels are adjusted independently. The invention is moreover not limited to the rear wheel drive vehicle of the aforesaid embodiment, and may be applied also to a front wheel drive or four wheel drive vehicle.

Still further, the control unit CU need not be the microprocessor 20, and may instead comprise an arrangement of electronic circuits such as a comparator circuit, computing circuit, logic circuit and parameter generating circuit.

The embodiments of this invention in which an exclusive property or privilege is claimed are defined as follows:

1. An antiskid braking device for braking a wheel of a vehicle, said device comprising:

a brake pedal, a master cylinder that generates a pressure according to a depression amount of said brake pedal, a wheel cylinder that applies a braking force to said wheel according to the pressure of said master cylinder, means for detecting a rotation speed of said wheel, means for detecting a vehicle speed, means for detecting said braking force, means for decreasing said braking force based on said wheel speed and said vehicle speed, means for increasing said braking force according to a target increase amount, means for computing a first target increase amount based on said wheel speed and said vehicle speed when said increasing means increases said braking force after said decreasing means has decreased said braking force, means for computing a second target increase amount based on a braking force amount which said decreasing means has decreased, means for measuring an elapsed time from when said decreasing means started decreasing said braking force until when said increasing means starts increasing said braking force, means for applying said first target increase amount to said increasing means when said elapsed time is longer than a predetermined value, and applying said second target increase amount to said increasing means when said elapsed time is shorter than said predetermined value.

2. An antiskid braking device as defined in claim 1, wherein said device further comprises a means for computing a wheel deceleration, a target wheel speed and a target wheel deceleration based on said wheel speed and vehicle speed, and said first target increase amount computing means comprises means for computing a proportional term comprising a difference between said wheel speed and said target wheel speed, means for computing a differential term comprising a difference between said wheel acceleration and said target wheel acceleration, and means for adding said differential term to said proportional term.

3. An antiskid braking device as defined in claim 1, wherein said device further comprises means for varying said predetermined value as a function of said vehicle speed.

4. An antiskid braking device as defined in claim 3, wherein said device further comprises means for computing a wheel deceleration, a target wheel speed and a target wheel deceleration based on said wheel speed and vehicle speed, and said first target increase amount computing means comprises means for computing a proportional term comprising a difference between said wheel speed and said target wheel speed, means for computing a differential term comprising a difference between said wheel acceleration and said target wheel acceleration, and means for adding said differential term to said proportional term.

* * * * *